US010878629B2

(12) United States Patent
Ishikawa et al.

(10) Patent No.: US 10,878,629 B2
(45) Date of Patent: Dec. 29, 2020

(54) DISPLAY APPARATUS, INFORMATION PROCESSING SYSTEM, AND CONTROL METHOD

(71) Applicant: Sony Corporation, Tokyo (JP)

(72) Inventors: Hirotaka Ishikawa, Kanagawa (JP); Tsubasa Tsukahara, Tokyo (JP)

(73) Assignee: Sony Corporation, Tokyo (JP)

(*) Notice: Subject to any disclaimer, the term of this patent is extended or adjusted under 35 U.S.C. 154(b) by 35 days.

(21) Appl. No.: 15/575,131

(22) PCT Filed: Apr. 5, 2016

(86) PCT No.: PCT/JP2016/001912
§ 371 (c)(1),
(2) Date: Nov. 17, 2017

(87) PCT Pub. No.: WO2016/189791
PCT Pub. Date: Dec. 1, 2016

(65) Prior Publication Data
US 2018/0144552 A1    May 24, 2018

(30) Foreign Application Priority Data
May 26, 2015   (JP) ................ 2015-106767

(51) Int. Cl.
*G06T 19/00*       (2011.01)
*G06F 3/0481*     (2013.01)
(Continued)

(52) U.S. Cl.
CPC .......... *G06T 19/006* (2013.01); *A63F 13/525* (2014.09); *G06F 3/011* (2013.01);
(Continued)

(58) Field of Classification Search
CPC .......... G06F 3/0481; G06F 3/011; G06F 3/01; G06T 7/70; G06T 19/00; G06T 19/006;
(Continued)

(56) References Cited

U.S. PATENT DOCUMENTS 8,339,399 B2* 12/2012 Snow ............ G06T 17/05
345/440
8,896,629 B2* 11/2014 Meier ........... G06F 3/011
345/632
(Continued)

FOREIGN PATENT DOCUMENTS

CN    101826129 A    9/2010
CN    102473324 A    5/2012
(Continued)

OTHER PUBLICATIONS

Maggraff et al., U.S. Appl. No. 62/074,927 (Year: 2014).*
(Continued)

*Primary Examiner* — Chante E Harrison
(74) *Attorney, Agent, or Firm* — Wolf, Greenfield & Sacks, P.C.

(57)    ABSTRACT

A display apparatus, an information processing system using the same, and a control method that are capable of providing information on a plurality of objects. A display apparatus includes a control unit and a display unit. The control unit groups a plurality of objects distributed in a reality space or a virtual space around a user and generates a distribution display, the distribution display displaying a region in which the grouped objects are distributed. The display unit presents the distribution display in a field of view of the user.

17 Claims, 26 Drawing Sheets

(51) Int. Cl.
G06T 7/70 (2017.01)
G06K 9/00 (2006.01)
G02B 27/01 (2006.01)
G06F 3/01 (2006.01)
A63F 13/525 (2014.01)

(52) U.S. Cl.
CPC ............ *G06F 3/012* (2013.01); *G06F 3/0481* (2013.01); *G06K 9/00624* (2013.01); *G06T 7/70* (2017.01); *G06T 19/00* (2013.01); *G02B 2027/014* (2013.01); *G02B 2027/0123* (2013.01)

(58) Field of Classification Search
CPC ............ G06T 11/60; G02B 2027/0123; G02B 2027/014; G02B 27/01; G02B 27/017; G06K 9/00624; A63F 13/525
USPC .................................................. 345/630–635
See application file for complete search history.

(56) References Cited

U.S. PATENT DOCUMENTS

| | | | | |
|---|---|---|---|---|
| 10,078,919 | B2* | 9/2018 | Powderly | G06F 3/0346 |
| 10,229,415 | B2* | 3/2019 | Huyi | G06Q 30/00 |
| 2006/0095521 | A1* | 5/2006 | Patinkin | G06Q 10/107 |
| | | | | 709/206 |
| 2011/0161875 | A1* | 6/2011 | Kankainen | G06F 3/0481 |
| | | | | 715/810 |
| 2012/0058823 | A1 | 3/2012 | Minato et al. | |
| 2012/0092369 | A1* | 4/2012 | Kim | G06T 11/00 |
| | | | | 345/633 |
| 2012/0148106 | A1* | 6/2012 | Sung | G06T 19/006 |
| | | | | 382/106 |
| 2013/0080890 | A1* | 3/2013 | Krishnamurthi | G06F 3/0488 |
| | | | | 715/702 |
| 2013/0093787 | A1* | 4/2013 | Fulks | G06T 11/60 |
| | | | | 345/629 |
| 2014/0053099 | A1* | 2/2014 | Groten | G01C 21/3682 |
| | | | | 715/790 |
| 2014/0074395 | A1* | 3/2014 | Brown | G01C 21/3682 |
| | | | | 701/424 |
| 2014/0204119 | A1* | 7/2014 | Malamud | G06F 16/438 |
| | | | | 345/633 |
| 2015/0109338 | A1* | 4/2015 | McKinnon | G06F 16/9535 |
| | | | | 345/633 |
| 2015/0178571 | A1 | 6/2015 | Zhang et al. | |
| 2015/0262428 | A1* | 9/2015 | Tatzgern | G06T 11/00 |
| | | | | 345/633 |
| 2015/0325041 | A1* | 11/2015 | Ha | G06T 15/506 |
| | | | | 345/426 |
| 2015/0332505 | A1* | 11/2015 | Wang | G06T 15/06 |
| | | | | 345/633 |
| 2016/0125655 | A1* | 5/2016 | Tian | H04W 4/025 |
| | | | | 345/633 |
| 2016/0300252 | A1* | 10/2016 | Frank | G06Q 30/0203 |
| 2017/0053623 | A1* | 2/2017 | Purayil | G09G 5/377 |
| 2017/0123492 | A1* | 5/2017 | Marggraff | G06F 3/0236 |
| 2017/0337739 | A1* | 11/2017 | Wu | G06T 19/006 |
| 2018/0089904 | A1* | 3/2018 | Jurgenson | G06T 7/20 |
| 2019/0333241 | A1* | 10/2019 | Yano | G06M 7/00 |

FOREIGN PATENT DOCUMENTS

| | | |
|---|---|---|
| CN | 103221953 A | 7/2013 |
| CN | 104571532 A | 4/2015 |
| JP | 2006-119297 A | 5/2006 |
| JP | 2010-238098 A | 10/2010 |
| JP | 2011-081556 A | 4/2011 |
| JP | 2012-059011 A | 3/2012 |
| JP | 2015-072607 A | 4/2015 |
| WO | WO 2014/043353 A2 | 3/2014 |

OTHER PUBLICATIONS

Wenhao, Yu et al., "The Visualization and Analysis of POI Features under Network Space Supported by Kernel Density Estimation", School of Resources and Environmental Science, pp. 1-9, Jan. 2015 (Year: 2015).*
Written Opinion and English translation thereof dated May 24, 2016 in connection with International Application No. PCT/JP2016/001912.
International Preliminary Report on Patentability and English translation thereof dated Dec. 7, 2017 in connection with International Application No. PCT/JP2016/001912.
Chinese Office Action dated Jun. 23, 2020 in connection with Chinese Application No. 201680028918.4 and English translation thereof.

* cited by examiner

A

B

A

B

A

B

A

B

DISPLAY APPARATUS, INFORMATION PROCESSING SYSTEM, AND CONTROL METHOD

CROSS-REFERENCE TO RELATED APPLICATIONS

This application is a National Stage of International Application No. PCT/JP2016/001912, filed in the Japanese Patent Office as a Receiving office on Apr. 5, 2016, which claims priority to Japanese Patent Application Number 2015-106767, filed in the Japanese Patent Office on May 26, 2015, each of which is hereby incorporated by reference in its entirety.

TECHNICAL FIELD

The present technology relates to a display apparatus, an information processing system using the same, and a control method that are capable of grouping a plurality of images displayed in a field of view for display.

BACKGROUND ART

There is known a technology called augmented reality (AR), in which a reality space or an image thereof is additionally provided with a corresponding image. According to this technology, for example, an image associated with an object in a reality space can be displayed on the object in a superimposed manner.

Meanwhile, in a case where pieces of additional information are displayed in one field of view, those pieces of additional information may be overlaid. In this regard, Patent Literature 1 describes an information processing apparatus configured to display, out of a plurality of objects in an image, additional information of an object whose hierarchy information is on the top of the hierarchy or to display additional information in accordance with the priority of the objects.

CITATION LIST

Patent Literature

Patent Literature 1: Japanese Patent Application Laid-open No. 2011-81556

DISCLOSURE OF INVENTION

Technical Problem

In the technology described in Patent Literature 1, however, in a case where the additional information of an object whose hierarchy information is on the top of the hierarchy is displayed, it is necessary to acquire the hierarchy information of the object. Further, in the same technology, in a case where the additional information is displayed in accordance with the priority of the objects, it is necessary to acquire information for determining the priority of the objects.

In other words, in a case where detailed information on objects cannot be acquired, the above technology cannot be applied. Therefore, there is a demand for a technology capable of presenting necessary information on a plurality of objects in a simpler manner.

In view of the circumstances as described above, it is an abject of the present technology to provide a display apparatus, an information processing system using the same, and a control method that are capable of providing information with simplicity and high visibility on a plurality of objects.

Solution to Problem

In order to achieve the object described above, a display apparatus according to one embodiment of the present technology includes a control unit and a display unit.

The control unit groups a plurality of objects distributed in a reality space or a virtual space around a user and generates a distribution display, the distribution display displaying a region in which the grouped objects are distributed.

The display unit presents the distribution display in a field of view of the user.

According to the configuration described above, the distribution display can express the distribution of the grouped objects. Therefore, information with simplicity and high visibility on a plurality of objects can be provided.

The control unit may generate the distribution display near the region in which the grouped objects are distributed.

Thus, the region in which the objects are distributed can be expressed by the arrangement of the distribution display.

Further, the control unit may generate the distribution display having a shape associated with a shape of the region in which the grouped objects are distributed.

Thus, the region in which the objects are distributed can be expressed by the shape of the distribution display.

In this case, the control unit may generate the distribution display having a shape expressing a biased distribution of the plurality of objects.

Thus, the biased distribution of the objects can be expressed by the shape of the distribution display.

The control unit may generate the distribution display having a transmittance at which the plurality of objects are viewable.

Thus, the plurality of objects can also be visually recognized, and the visibility in the field of view can be improved.

The control unit may generate the distribution display such that at least any one of hue, brightness, and saturation is changed on the basis of a density of the grouped objects.

For example, the control unit may generate the distribution display in which a region having a higher density of the grouped objects has a color tone with a higher brightness or a color tone with a lower brightness.

Thus, the distribution display can express the density of the plurality of objects.

Further, the control unit may generate the distribution display by using a probability density function, the probability density function using, as a variable, coordinates indicating a position of each of the grouped objects in the field of view.

For example, the probability density function may be a Gaussian function.

Thus, the distribution of the objects can be adequately expressed.

Specifically, the control unit may derive the probability density function and generate the distribution display that is superimposed on a region in the field of view, in which a distribution probability of the objects has a predetermined value when the derived probability density function is integrated by the variable.

Thus, in light of the distribution probability of the objects, the distribution of the objects can be more adequately expressed.

Further, the control unit may group a plurality of objects having associated additional information out of a plurality of objects distributed in the field of view.

Thus, a distribution display for objects having additional information of an associated attribute or the like can be generated.

The control unit may group a plurality of objects forming a density of a predetermined reference or more out of a plurality of objects distributed in the field of view.

Thus, AR icons or the like can be prevented from being disposed in a congested manner.

Further, the control unit may be configured to be capable of switching between a first mode of executing drawing processing on a group including the plurality of objects and a second mode of executing drawing processing on each of the grouped objects.

Thus, detailed information can be provided to each of the objects as needed.

In this case, the control unit may select the first mode when it is determined that a density of the grouped objects in the field of view is a predetermined reference or more.

Thus, AR icons or the like can be prevented from being disposed in a congested manner.

The control unit may be configured to switch from the first mode to the second mode when it is determined that the user is observing the distribution display.

For example, the control unit may determine that the user is observing the distribution display when it is determined that the distribution display is displayed at the center of the field of view.

Thus, detailed information on each of the grouped objects can be provided on the basis of a user's intension.

When determining that a proportion of an area of the distribution display in the field of view is larger than a predetermined proportion, the control unit may reduce the distribution display to the predetermined proportion or less.

Thus, a distribution display having a shape corresponding to the size of the field of view and having high visibility can be presented.

The display unit may be configured to be wearable by the user.

Thus, the display apparatus can be configured as a wearable display.

An information processing system according to another embodiment of the present technology includes a control apparatus and a display apparatus.

The control apparatus is configured to be capable of storing information on a plurality of objects distributed in a reality space or a virtual space around a user and outputting the information on the plurality of objects.

The display apparatus includes a control unit and a display unit.

The control unit groups the plurality of objects and generates a distribution display, the distribution display displaying a region in which the grouped objects are distributed.

The display unit presents the distribution display in a field of view of the user.

A control method according to still another embodiment of the present technology includes the steps of: grouping a plurality of objects distributed in a reality space or a virtual space around a user; generating a distribution display, the distribution display displaying a region in which the grouped objects are distributed; and presenting the distribution display in a field of view of the user.

Advantageous Effects of Invention

As described above, according to the present technology, it is possible to provide a display apparatus, an information processing system using the same, and a control method that are capable of providing information with simplicity and high visibility on a plurality of objects.

Note that the effects described herein are not necessarily limited and any one of the effects described in the present disclosure may be produced.

MODE(S) FOR CARRYING OUT THE INVENTION

Hereinafter, embodiments according to the present technology will be described with reference to the drawings.

First Embodiment

[Schematic Configuration of AR System]

Figure 1:
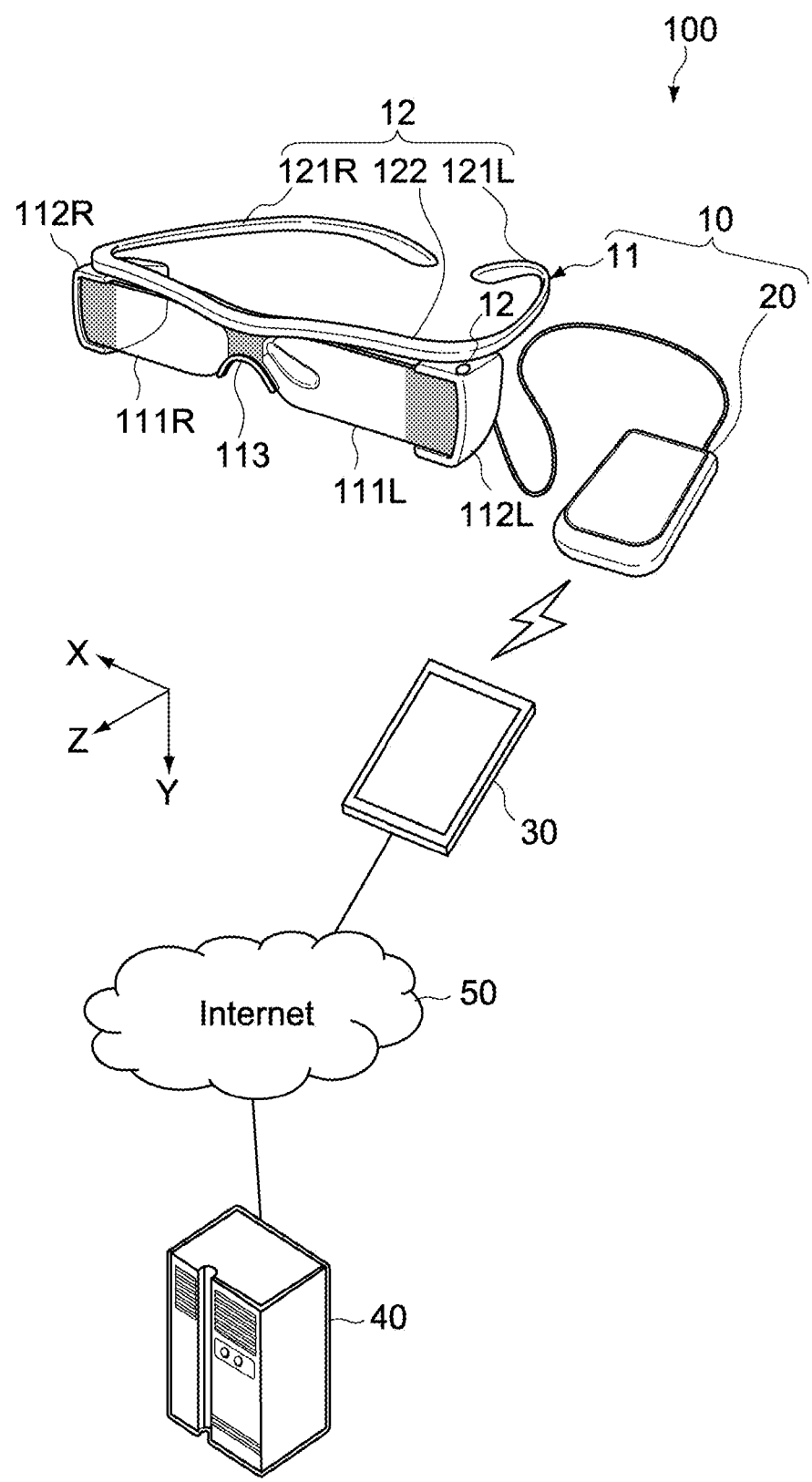
FIG. 1 is a schematic diagram showing a configuration of an augmented reality (AR) system (information processing system) according to a first embodiment of the present technology.

FIG. 1 is a schematic diagram showing a configuration of an augmented reality (AR) system (information processing system) according to a first embodiment of the present technology.

In the figure, an X-axis direction and a Z-axis direction represent horizontal directions orthogonal to each other, and a Y-axis direction represents a vertical-axis direction. The XYZ orthogonal coordinate system represents a coordinate system in a real space to which a user belongs. The arrow of the X-axis represents a right direction of the user, and the arrow of the Y-axis represents a downward direction of the user. Further, the arrow of the Z-axis represents a forward direction of the user.

As shown in FIG. 1, an AR system 100 includes a head mounted display (HMD) 10, a portable information terminal 30, and an AR server 40.

The AR server 40 is a server apparatus on the Internet 50. The AR server 40 stores information on an object to be described later and functions as a "control apparatus" in this embodiment.

The portable information terminal 30 is typically a smartphone and is constituted of an information processing apparatus such as a mobile phone, a tablet terminal, a personal computer (PC), a tablet PC, or a PDA (Personal Digital Assistant).

The portable information terminal 30 can acquire a current position of the user by a GPS (Global Positioning System) function. Further, the portable information terminal 30 is connected to the AR server 40 via the Internet 50 and can acquire information on AR display processing or the like from the AR server 40. Additionally, the portable information terminal 30 is connected to a controller 20 by a short-range wireless communication system such as Bluetooth (registered trademark) and can send the information on AR display processing or the like and information on the current position of the user to the controller 20.

The HMD 10 includes a display unit 11 configured as a see-through display with an eyeglass shape and the controller 20 and functions as a "display apparatus" in this embodiment. Note that FIG. 1 schematically shows the shape of the HMD 10.

The controller 20 controls the operation of the HMD 10 on the basis of an input operation by the user. The controller 20 is connected to the display unit 11 with a cable conforming to predetermined standards and executes processing on the basis of the information acquired from the portable information terminal 30.

Thus, the HMD 10 can provide a field of view, in which an image associated with objects distributed in a reality space is superimposed on the objects, to the user wearing the HMD 10 via the see-through display. Hereinafter, an image associated with an object is referred to as an AR icon.

Note that the "object distributed in a reality space" used herein may be an object in the reality space or may be a virtual object that is not in the reality space and is displayed so as to be superimposed on the reality space.

[General Outline of Function of AR System]

Figure 2:
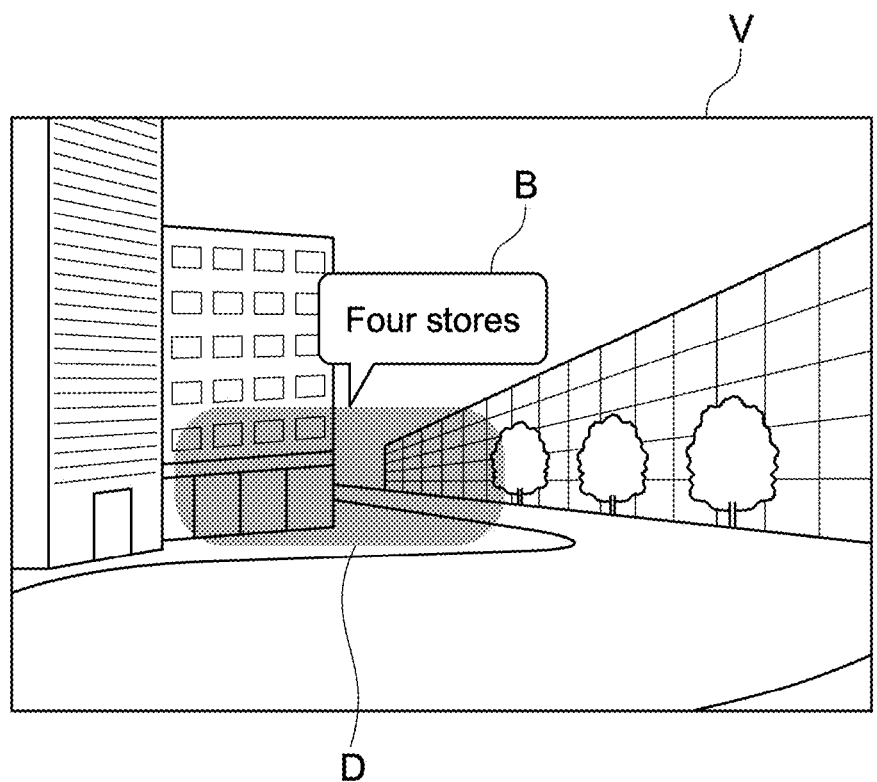
FIG. 2 is a diagram showing an example of a field of view of a head mounted display (HMD) (display apparatus) of the AR system.

FIG. 2 is a diagram showing an example of a field of view V of the HMD 10.

The field of view V is formed on the see-through display. In the example of the figure, two buildings in the reality space are displayed in a see-through manner. Two stores included in one building and two stores included in the other building are assumed as objects. Using the AR technology, for example, as shown in those figures, an AR icon B representing additional information can be displayed in a superimposed manner on the objects in the reality space.

As shown in FIG. 2, according to this embodiment, the four stores are grouped, and a distribution display D is displayed for the grouped object. The distribution display D has a shape associated with a shape of a region in which the grouped objects are distributed, and is displayed near the region in which those objects are distributed. Further, the AR icon B is not displayed for each object but displayed for the group described above, for example.

In such a manner, according to the distribution display D, the distribution of a plurality of objects is intuitively presented.

Figure 3:
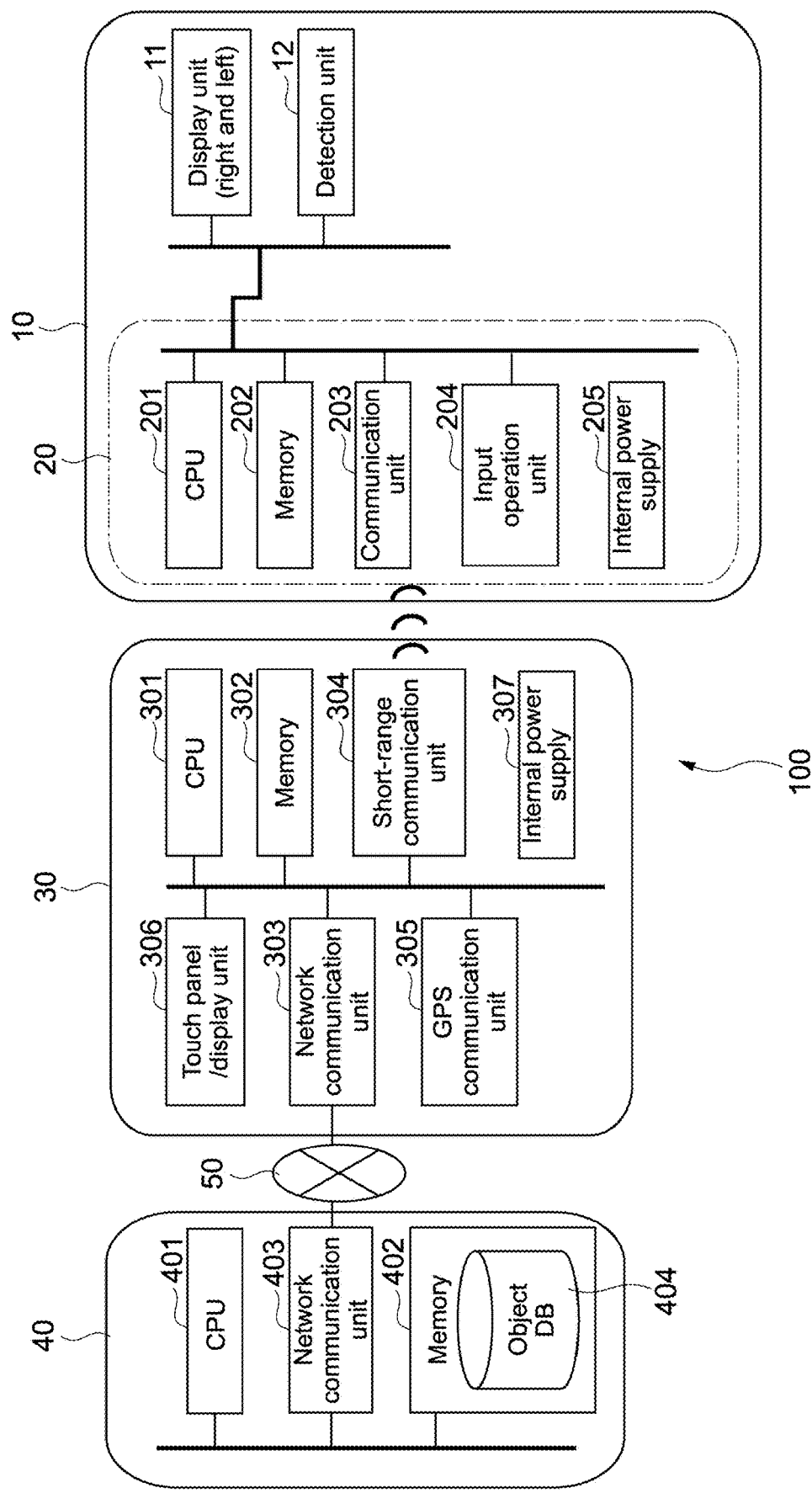
FIG. 3 is a block diagram showing a configuration of the AR system.

FIG. 3 is a block diagram showing a configuration of the AR system 100.

Hereinafter, the elements of the AR system 100 will be described with reference to FIG. 3.

[Configuration of AR Server]

As shown in FIG. 3, the AR server 40 includes a CPU 401, a memory 402, and a network communication unit 403. For example, the AR server 40 is configured to be capable of storing information on a plurality of objects distributed in a reality space around the user and outputting the information on a plurality of objects. The AR server 40 may have, though not shown in the figure, a configuration of an input device, a display device, a speaker, or the like as needed.

The CPU 401 controls the entire operation of the AR server 40.

The memory 402 includes a ROM (Read Only Memory), a RAM (Random Access Memory), or a non-volatile memory such as an HDD (Hard Disk Drive) or a flash memory (SSD; Solid State Drive) and stores a program for executing control of the AR server 40 by the CPU 401, various parameters, and other necessary data.

The network communication unit 403 communicates with the portable information terminal 30 via the Internet 50. A communication method is not particularly limited and may be wired communication using a NIC (Network Interface Card) for Ethernet (registered trademark) or wireless communication using a wireless LAN (IEEE802.11 etc.) such as WiFi (Wireless Fidelity) or using a 3G or 4G network for mobile communication.

Further, the memory 402 holds an object database 404.

The object database 404 stores, for each object, information such as an attribute of the object or a position of the object. Further, the object database 404 may be aggregate of databases including objects having an identical attribute.

Information on a new object is appropriately added to and registered in the object database 404 by the portable information terminal 30, another portable information terminal, an information processing apparatus, or the like connected to the AR server 40 via the Internet 50.

[Configuration of Portable Information Terminal]

As shown in FIG. 3, the portable information terminal 30 includes a CPU 301, a memory 302, a network communication unit 303, a short-range communication unit 304, a GPS communication unit 305, a display unit 306 equipped with a touch panel, and an internal power supply 307.

The CPU 301 controls the entire operation of the portable information terminal 30.

The memory 302 includes a ROM, a RAM, a non-volatile memory, or the like and stores an application program for executing control of the portable information terminal 30 by the CPU 301, various parameters, and information on an object, which is to be sent to the controller 20, and other necessary data.

The network communication unit 303 communicates with the AR server 40 or the like by using a wireless LAN (IEEE802.11 etc.) such as WiFi (Wireless Fidelity) or using a 3G or 4G network for mobile communication. The portable information terminal 30 downloads information on an object, which is to be sent to the controller 20, from the AR server 40 via the network communication unit 303 and stores the information in the memory 302.

The short-range communication unit 304 communicates with the controller 20 or another portable information terminal by using a short-range communication system such as Bluetooth (registered trademark) or infrared communication.

The GPS communication unit 305 receives a signal from a GPS satellite to acquire a current position of the user carrying the portable information terminal 30.

The display unit 306 is constituted of, for example, an LCD (Liquid Crystal Display) or an OELD (Organic ElectroLuminescence Display) and displays various menus, GUIs of an application, or the like. Typically, the display unit 306 is equipped with a touch panel and is capable of receiving a touch operation of the user.

The internal power supply 307 supplies power necessary to drive the portable information terminal 30.

[Configuration of HMD]

As shown in FIGS. 1 and 3, the HMD 10 includes the display unit 11, a detection unit 12, and the controller 20.

(Display Unit)

The display unit 11 is configured to be capable of presenting a distribution display in a field of view of the user and is configured to be wearable on the head of the user. The display unit 11 presents a reality space that is seen through the field of view and also displays an AR icon in this reality space in a superimposed manner. The display unit 11 includes first and second display surfaces 111R and 111L, first and second image generation units 112R and 112L, and a support 113.

The first and second display surfaces 111R and 111L are constituted of optical elements with transparency, which are capable of respectively providing the reality space (external field of view) to the right eye and the left eye of a user U.

The first and second image generation units 112R and 112L are configured to be capable of generating images respectively presented to the user U via the first and second display surfaces 111R and 111L.

The support 113 has an appropriate shape capable of supporting the display surfaces 111R and 111L and the image generation units 112R and 112L and being wearable on the head of the user such that the first and second display surfaces 111R and 111L respectively face the right eye and the left eye of the user U.

The display unit 11 configured as described above is configured to be capable of providing the field of view V, in which a predetermined image (or virtual image) is superimposed in a real space via the display surfaces 111R and 111L, to the user U.

(Detection Unit)

The detection unit 12 can detect a change in posture of the display unit 11. In this embodiment, the detection unit 12 is configured to detect changes in posture about the X, Y, and Z axes, respectively.

The detection unit 12 can be constituted of a motion sensor such as an angular velocity sensor or an acceleration sensor or constituted of a combination thereof. In this case, the detection unit 12 may be constituted of a sensor unit in which the angular velocity sensor and the acceleration sensor are each disposed in the three axis directions or may use different sensors in accordance with the respective axes. For example, an integral value of outputs from the angular velocity sensor can be used for the change in posture, the direction of the change, the amount of the change, and the like of the display unit 11.

Further, in order to detect a direction of the display unit 11 about the vertical axis (Z axis), a geomagnetic sensor may be used. Alternatively, the geomagnetic sensor and the above-mentioned motion sensor may be used in combination. This enables highly accurate detection of the direction or change in posture.

The detection unit 12 is disposed at an appropriate position of the display unit 11. The position of the detection unit 12 is not particularly limited. For example, the detection unit 12 may be disposed on one of the image generation units 112R and 112L or disposed at a part of the support 113.

(Controller)

The controller 20 functions as a control unit of the HMD 10 and groups a plurality of objects distributed in a reality space or a virtual space around the user to generate a distribution display. Hereinafter, an example in which objects are distributed in the reality space will be described, but the objects may be distributed in a virtual space as will be described later.

As shown in FIG. 3, the controller 20 includes a CPU 201, a memory 202, a communication unit 203, an input operation unit 204, and an internal power supply 205.

The CPU 201 controls the entire operation of the controller 20. The memory 202 includes a ROM, a RAM, or the like and stores a program for executing control of the controller 20 by the CPU 201, various parameters, information on an object, and other necessary data. The communication unit 203 forms an interface for short-range communication with the portable information terminal 30.

The input operation unit 204 is for controlling images displayed on the HMD 10 by a user's operation. The input operation unit 204 may be constituted of a mechanical switch and/or a touch sensor.

The internal power supply 205 supplies power necessary to drive the HMD 10.

The HMD 10 may further include a sound output unit such as a speaker, a camera, and the like. In this case, the voice output unit and the camera are typically provided to the display unit 11. Additionally, the controller 20 may be provided with a display device that displays an input operation screen of the display unit 11 or the like. In this case, the input operation unit 204 may be constituted of a touch panel provided to the display device.

[Functional Configuration of Controller]

Figure 4:
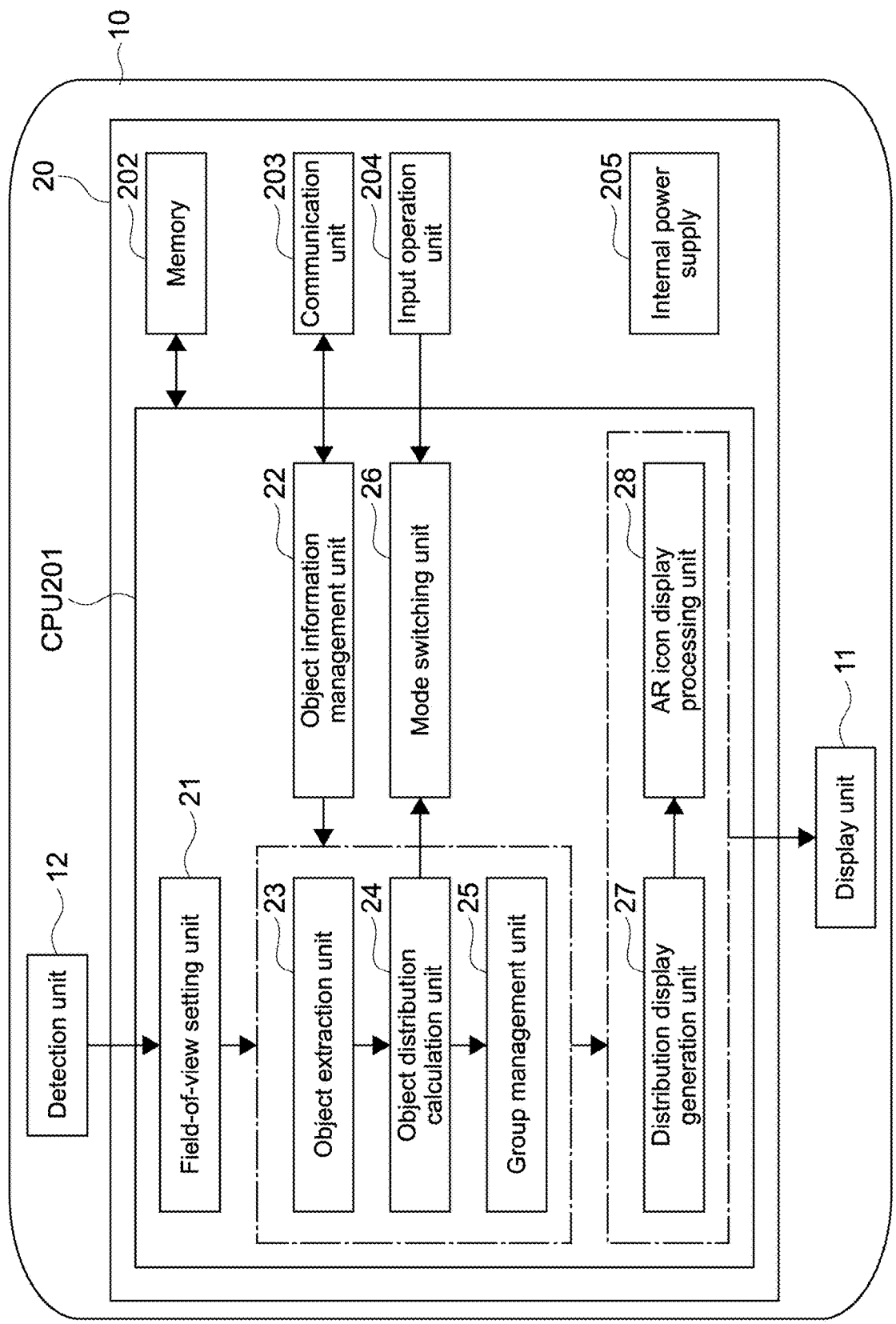
FIG. 4 is a block diagram of the HMD for describing a functional configuration of a controller of the HMD.

FIG. 4 is a block diagram of the HMD 10 for describing a functional configuration of the controller.

As shown in the figure, the controller 20 includes a field-of-view setting unit 21, an object information management unit 22, an object extraction unit 23, an object distribution calculation unit 24, a group management unit 25, a mode switching unit 26, a distribution display generation unit 27, and an AR icon display processing unit 28. Those elements are executed by the CPU 201 mainly according to an application program stored in the memory 202. Hereinafter, those elements will be described.

(Field-of-View Setting Unit)

The field-of-view setting unit 21 sets the range of a field of view on the basis of a posture of the display unit 11, which is calculated from a detection result of the detection unit 12. In this embodiment, when the field-of-view setting unit 21 sets the range of a field of view, virtual cylindrical coordinates C0 that surrounds the user U about a vertical axis Az are used.

Figure 5:
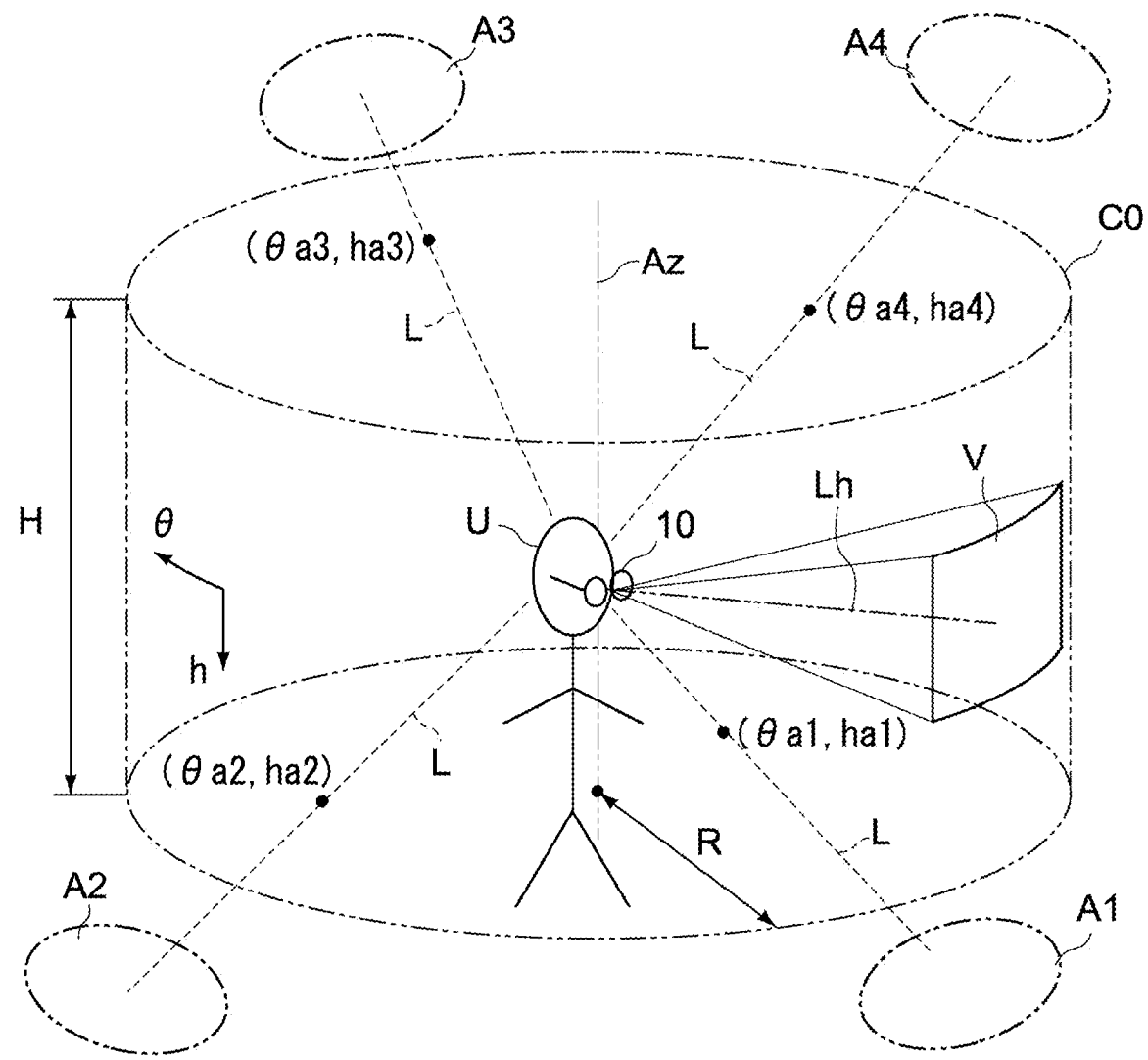
FIG. 5 is a schematic diagram for describing cylindrical coordinates and a field of view.

FIG. 5 is a schematic diagram for describing the cylindrical coordinates C0 and the field of view V.

As shown in the figure, the cylindrical coordinates C0 are in a coordinate system having the vertical axis Az at a position of the user U (display unit 11) and specifying a position on a virtual circumferential surface, which is disposed at a position of a distance (radius) R from the vertical axis Az. The cylindrical coordinates C0 have a coordinate axis ($\theta$) in a circumferential direction and a coordinate axis (h) in a height direction. The coordinate axis ($\theta$) in the circumferential direction represents an angle about the vertical axis with a northern direction being as 0°. The coordinate axis (h) in the height direction represents an angle in an upward and downward direction with a line of sight Lh of the user U in the horizontal direction being as a reference. The coordinate axis ($\theta$) sets an eastward direction as a positive direction, and the coordinate axis (h) sets an angle of depression as a positive direction and sets an angle of elevation as a negative direction. The radius R and the height H of the cylindrical coordinates C0 can be optionally set. Note that the position of the user U, by which the vertical axis Az is specified, is specified by a position of the user U that is acquired by the portable information terminal 30.

As shown in the figure, the field-of-view setting unit 21 calculates a change in posture of the display unit 11 on the basis of an output of the detection unit 12 and determines to which region the field of view V of the user U belongs on the cylindrical coordinates C0. The region to which the field of view V belongs on the cylindrical coordinates C0 is specified by the ranges of $\theta$ and h. The field of view V moves on the cylindrical coordinates C0 in accordance with the change in posture of the user U, and the movement direction or the amount of movement thereof are calculated on the basis of an output of the detection unit 12.

Figure 6:
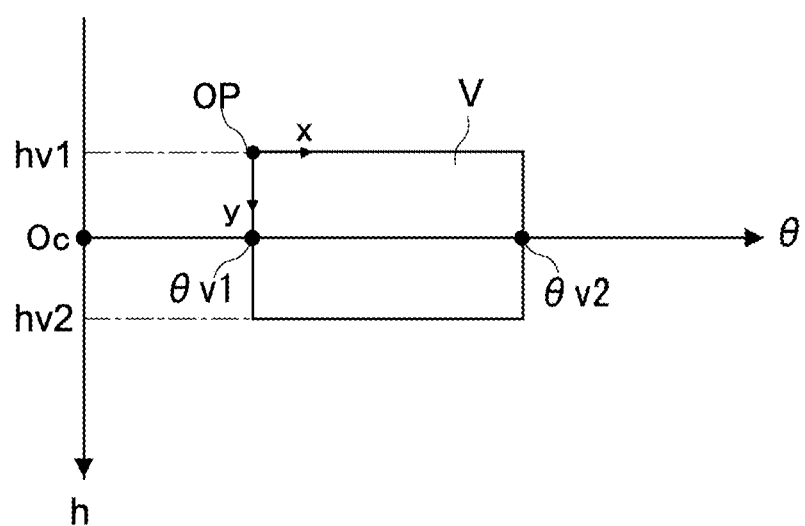
FIG. 6 is a development diagram of cylindrical coordinates showing a field of view on the cylindrical coordinates.

FIG. 6 is a development diagram of the cylindrical coordinates C0, showing the field of view V on the cylindrical coordinates C0. A reference symbol Oc in the figure represents the origin of the cylindrical coordinates C0.

The field of view V has a substantially rectangular shape. For example, the range of the field of view V in the circumferential direction is expressed by the following expression (1).

$$\theta v1 \leq \theta v \leq \theta v2 \quad (1)$$

Meanwhile, the range of the field of view V in the height direction is expressed by the following expression (2).

$$hv1 \leq hv \leq hv2 \quad (2)$$

Additionally, the field of view V has xy coordinates (local coordinates) in which the upper left corner is the origin OP. An x axis is an axis extending in the horizontal direction from the origin OP. A y axis is an axis extending in a perpendicular direction from the origin OP. Details thereof will be described later.

(Object Information Management Unit)

The object information management unit 22 acquires information on a predetermined object from the portable information terminal 30 via the communication unit 203 and manages the acquired information of the object. A timing at which the object information management unit 22 acquires an object can be set to, for example, a timing at which it is determined that the current position is changed by a predetermined distance or more, as will be described later.

In this embodiment, the object information management unit 22 can acquire information of a plurality of objects from the object database 404 via the portable information terminal 30.

The information of an object includes, for example, information such as an attribute of the object, the name of the object, and the position of the object. The information on the position of the object typically includes information of an absolute position (latitude, longitude, or the like) of the object.

(Object Extraction Unit)

The object extraction unit 23 extracts objects distributed in the field of view V, out of objects whose information are acquired, on the basis of a processing result of the field-of-view setting unit 21.

Firstly, the object extraction unit 23 calculates coordinates ($\theta a$, ha) of an object on the cylindrical coordinates C0 on the basis of an absolute position of the object and the current position of the user. The current position of the user can be acquired from the portable information terminal 30.

The object extraction unit 23 can extract an object whose coordinates ($\theta a$, ha) are included in the range of the field of view V in the cylindrical coordinates C0 (the range of Expressions (1) and (2)).

Referring back to FIG. 5 again, the coordinates ($\theta a$, ha) of the object in the cylindrical coordinates C0 will be described.

Objects A1 to A4 are in the reality space and typically located at positions farther than the radius R of the cylindrical coordinates C0 from the user U. Therefore, as shown in the figure, each position of the objects A1 to A4 in the cylindrical coordinates C0 can be specified by an intersecting position between a line of sight L of the user observing each of the objects A1 to A4 and the cylindrical coordinates C0. The positions of the objects A1 to A4 in the cylindrical coordinates C0 are each expressed by coordinates (θa, ha) on the cylindrical coordinates C0.

Note that, in the example in the figure, the center position of each of the objects A1 to A4 is matched with each intersecting position, but is not limited thereto. A part of the periphery of the object (e.g., a part of four corners) may be matched with the intersecting position. Alternatively, the positions of the objects A1 to A4 may be caused to correspond to optional positions separated from the intersecting positions.

(Object Distribution Calculation Unit)

The object distribution calculation unit 24 calculates a distribution of the extracted objects.

The object distribution calculation unit 24 can execute processing of converting the position (θa, ha) of each object, which is determined to be displayed in the field of view V, into local coordinates (xa, ya) in the field of view V, to calculate the distribution of the objects in the field of view V.

Figure 7:
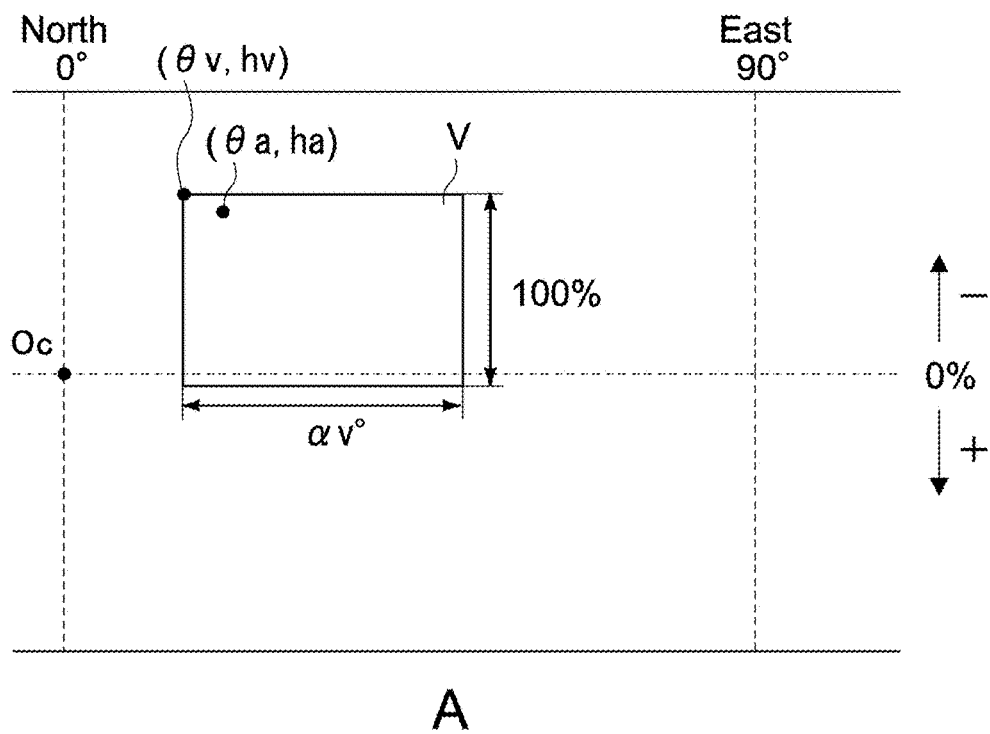
FIG. 7 is a diagram for describing a conversion method from the cylindrical coordinates to a field of view (local coordinates).
Figure 7:
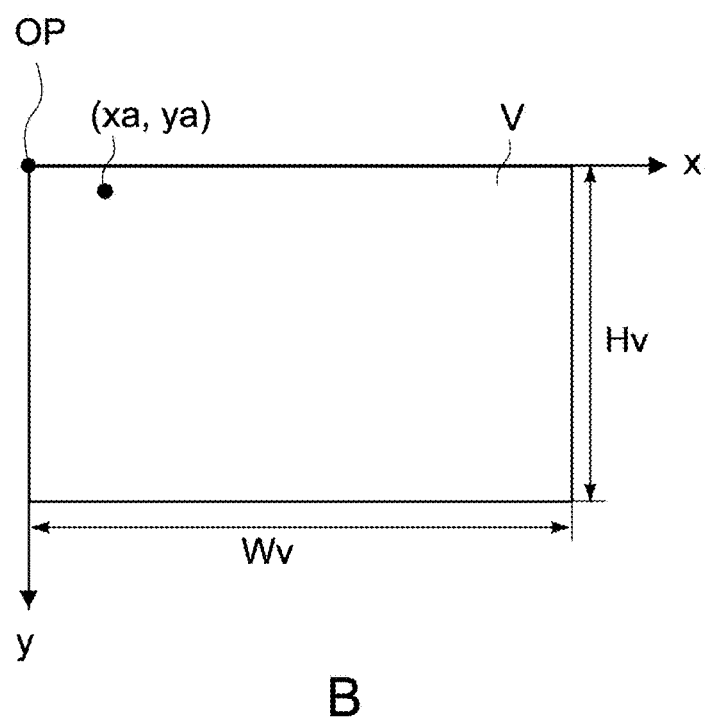

A and B of FIG. 7 is a diagram for describing a conversion method from the cylindrical coordinates C0 to the field of view V (local coordinates).

As shown in A of FIG. 7, coordinates of a reference point of the field of view V on the cylindrical coordinates C0 are assumed as (θv, hv), and coordinates of a reference point of an object A positioned in the field of view V are assumed as (θa, ha). The reference points of the field of view V and the object A may be set at any points and, in this example, set at the upper left corner of the field of view V having a rectangular shape and the object A. α[°] is a width angle of the field of view V in the cylindrical coordinates, and a value thereof is determined depending on the design or specifications of the display unit 11.

The object distribution calculation unit 24 converts the cylindrical coordinate system (θ, h) into the local coordinate system (x, y), to thus determine the position of the object A in the field of view V. As shown in B of FIG. 7, assuming that the height and the width of the field of view V in the local coordinate system are Hv and Wv, and the coordinates of the reference point of the object A in the local coordinate system (x, y) are (xa, ya), the following conversion expressions are given.

$$xa = (\theta a - \theta v) \cdot Wv/\alpha v \qquad (3)$$

$$ya = (ha - hv) \cdot Hv/100 \qquad (4)$$

Thus, the object distribution calculation unit 24 can calculate coordinates (xa, ya) of each object in the field of view V on the basis of the conversion expressions described above.

(Group Management Unit)

The group management unit 25 groups a plurality of objects distributed in a reality space around the user and also manages information of the group. The objects to be grouped can be objects distributed in a direction of the field of view V, for example. Information of the group includes information such as the number of objects included in the group and a common attribute of the objects, which is acquired from the object information management unit 22, for example.

The group management unit 25 groups a plurality of objects on the basis of a predetermined condition. Examples of the predetermined condition include a density of the plurality of objects in the field of view V and a commonality of an attribute of the objects.

Further, when the group management unit 25 determines that the density of the grouped objects in the field of view V is reduced to be less than a predetermined reference, for example, because the user comes close to an object, the group management unit 25 can also restructure the group.

(Mode Switching Unit)

The mode switching unit 26 is configured to be capable of switching between a first mode of executing drawing processing on the group including the plurality of objects and a second mode executing drawing processing on each of the grouped objects. The "drawing processing on the group" described herein refers to, for example, processing of drawing a distribution display on that group or processing of drawing an AR icon displaying additional information of the group. The "drawing processing on each of the grouped objects" refers to, for example, processing of drawing an AR icon displaying additional information of each object.

The mode switching unit 26 switches between the first mode and the second mode on the basis of a predetermined condition. For example, when it is determined that a user's operation corresponding to the mode switching is received by the input operation unit 204, the mode switching unit 26 may switch between the first mode and the second mode.

(Distribution Display Generation Unit)

The distribution display generation unit 27 generates a distribution display that displays a region in which the grouped objects are distributed. In this embodiment, the distribution display generates a distribution display that has a shape associated with a shape of the region in which the grouped objects are distributed, and is displayed near the region in which those objects are distributed.

For example, the distribution display generation unit 27 can generate the distribution display by using a probability density function, the probability density function using, as a variable, the coordinates (xa, ya) indicating a position of each of the grouped objects in the field of view. Details thereof will be described later.

The distribution display generation unit 27 may generate the distribution display in either of the first mode and the second mode or may generate the distribution display in the first mode only.

(AR Icon Display Processing Unit)

The AR icon display processing unit 28 executes processing of displaying an AR icon that provides additional information of the objects distributed in the field of view V. The AR icon is an image displaying additional information of the objects A1 to A4 and may be an image including characters, pictures, and the like or may be an animation image. Further, the AR icon may be a two-dimensional image or a three-dimensional image. Additionally, the shape of the AR icon may be rectangular, circular, or another geometric shape and can be appropriately set according to the type of the AR icon.

The AR icon display processing unit 28 displays an AR icon for each of the grouped objects in the second mode.

The AR icon display processing unit 28 can display one AR icon for the group in the first mode, for example. In this case, the AR icon can display the number of objects that belong to the group, a common attribute of the plurality of objects that belong to the group, and the like.

The AR icon display processing unit 28 can display the AR icon in a predetermined region of the field of view V on the basis of the distribution of objects. For example, the AR icon display processing unit 28 may display the AR icon at a position separated by a predetermined distance from the position of each object (intersecting position between the line of sight L of the user observing the object and the cylindrical coordinates C0). Alternatively, the AR icon display processing unit 28 may calculate a region of the object or the distribution display and display the AR icon near that region.

[Example of Operation of AR System]

(Processing of Acquiring Object Information)

Figure 8:
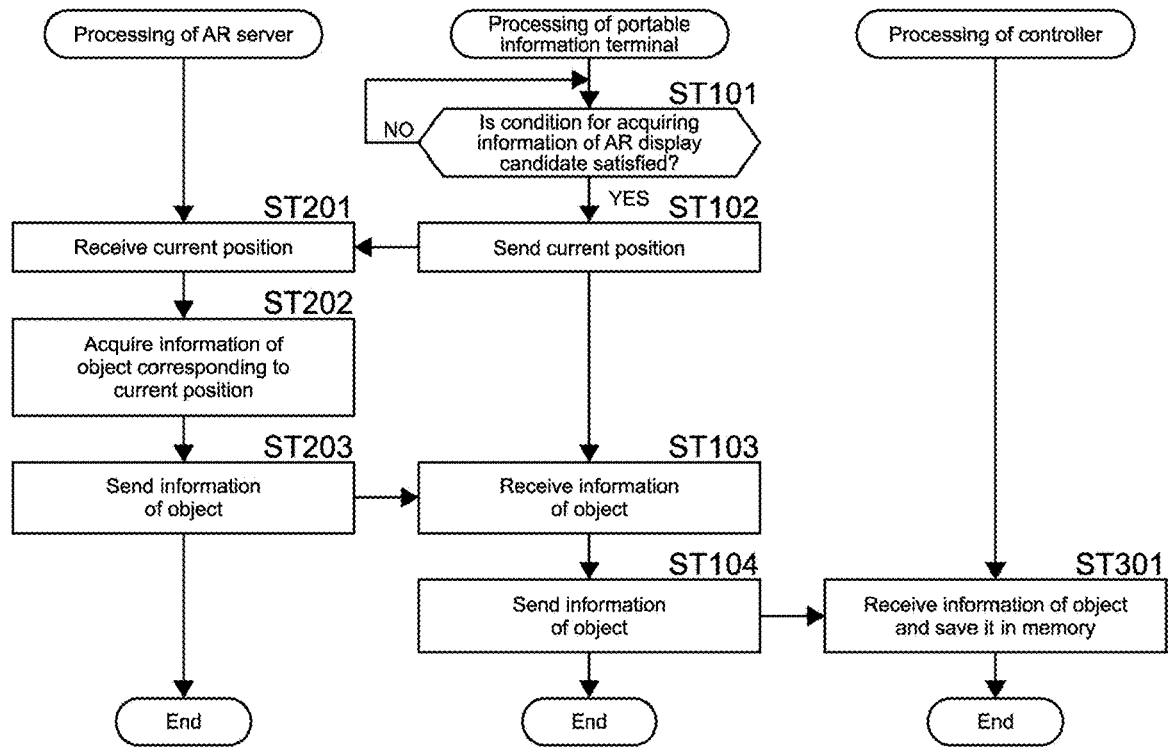
FIG. 8 is a flowchart showing a flow of processing in the AR system.
Figure 8:
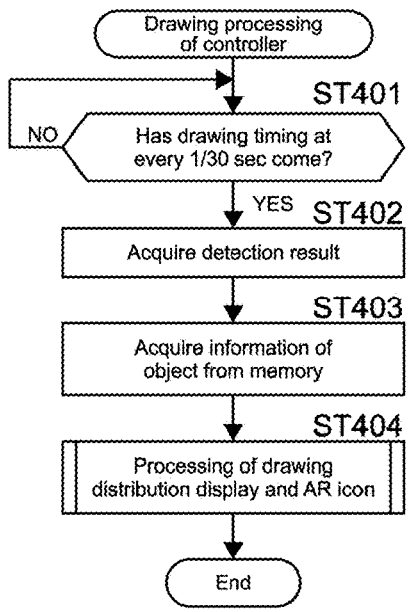

A of FIG. 8 is a flowchart showing a flow of processing of acquiring object information in the controller 20. In this example of operation, when the current position of the user is changed by, for example, 50 m or more, the controller 20 executes processing of acquiring the object information.

Note that, in the figure, processing of ST101 to ST104 are executed by the portable information terminal 30. Further, processing of ST201 to ST203 are executed by the AR server 40, and processing of ST301 is executed by the controller 20 of the HMD 10.

Firstly, the CPU 301 of the portable information terminal 30 determines whether a condition for acquiring information of an AR display candidate is satisfied or not (ST101). Specifically, the CPU 301 may determine whether the current position of the user is changed by 50 m or more on the basis of information of the current position acquired from the GPS communication unit 305. Further, in addition to or instead of the above, the CPU 301 may determine whether a notification on a change in state of the AR display candidate is received or not from the server 40.

When it is determined that the condition for acquiring information of an AR display candidate is satisfied (Yes in ST101), the network communication unit 303 sends the current position, which is acquired from the GPS communication unit 305, to the AR server 40 under the control of the CPU 301 (ST102).

The network communication unit 403 of the AR server 40 receives the current position, which is sent from the portable information terminal 30, under the control of the CPU 401 (ST201). Subsequently, the CPU 401 acquires information of an object, which corresponds to the acquired current position, from the object database 404 (ST202). The network communication unit 403 then sends the acquired information of an object to the portable information terminal 30 to the portable information terminal 30 under the control of the CPU 401 (ST203).

The network communication unit 303 of the portable information terminal 30 acquires the information of an object, which is sent from the AR server 40, under the control of the CPU 301 (ST103). Subsequently, the short-range communication unit 304 sends the acquired information of an object to the controller 20 under the control of the CPU 301 (ST104).

Finally, the communication unit 203 of the controller 20 receives the information of an object, which is sent from the portable information terminal 30, under the control of the CPU 201, and the CPU 201 saves that information in the memory 202 (ST301).

Thus, the object information management unit 22 of the controller 202 can acquire information of a plurality of objects included in the object database 404.

Meanwhile, the controller 20 executes drawing processing at a predetermined timing using the acquired information of an object. Hereinafter, the general outline of the drawing processing by the CPU 201 of the controller 20 that serves as a subject of operation will be described.

(Drawing Processing of Controller)

B of FIG. 8 is a flowchart showing a flow of drawing processing of the controller.

Firstly, the CPU 201 determines whether a drawing timing at 1/30 sec has come or not.

When it is determined that the drawing timing has come (Yes in ST401), the CPU 201 acquires a detection result of the detection unit 12 (ST402).

Subsequently, the CPU 201 acquires information of an object from the memory 202 (ST403). Specifically, the CPU 201 (object information management unit 22) acquires a plurality of objects included in each database, which is shown in ST301 in A of FIG. 8.

Subsequently, the CPU 201 executes processing of drawing a distribution display and an AR icon by cooperating with the memory 202 (ST404). Thus, the display unit 11 can output a display result of the drawing processing from the field of view V.

Hereinafter, details of the processing of drawing a distribution display and an AR icon will be described.

(Processing of Drawing Distribution Display and AR Icon)

Figure 9:
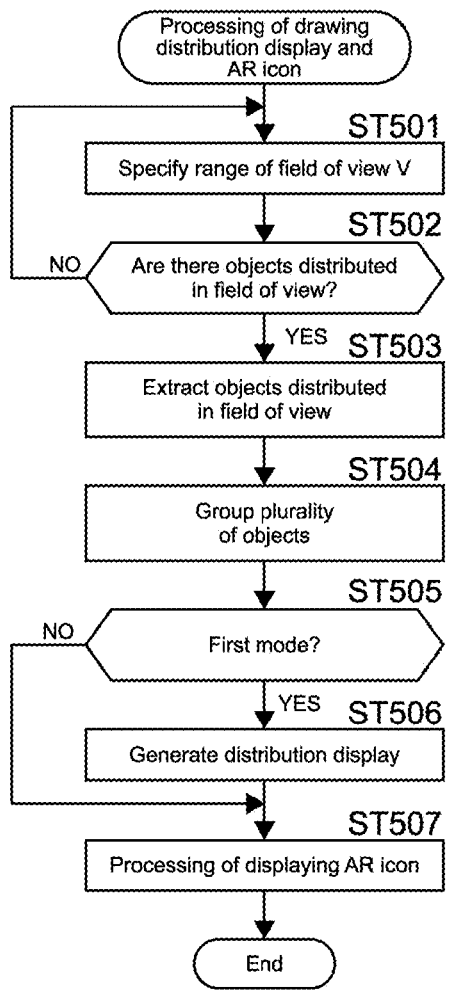
FIG. 9 is a flowchart showing a flow of processing of drawing a distribution display and an AR icon, which is shown in FIG. 8.

FIG. 9 is a flowchart showing a flow of the processing of drawing a distribution display and an AR icon of the controller 20. Here, it is assumed that the CPU 201 executes the processing according to an eating-place search application program stored in the memory 202.

Firstly, the field-of-view setting unit 21 sets a range of the field of view V on the basis of the posture of the display unit 11, which is calculated from a detection result of the detection unit 12 (ST501). The range of the field of view V is expressed by Expressions (1) and (2) using the cylindrical coordinates C0.

Subsequently, the object extraction unit 23 determines whether there are objects distributed in the field of view V on the basis of a processing result of the field-of-view setting unit 21 (ST502). When it is determined that there are objects (Yes in ST502), the object extraction unit 23 extracts the objects distributed in the field of view V (ST503).

For specific processing, the object extraction unit 23 calculates coordinates (θa, ha) of each object on the cylindrical coordinates C0, as described with reference to FIG. 5, on the basis of the information of the current position, which is acquired by the GPS communication unit 305, and the absolute position of each object.

The object extraction unit 23 then determines whether there are objects having coordinates (θa, ha) included in the range of the field of view V (the range of Expressions (1) and (2)) in the cylindrical coordinates C0 (ST502). When it is determined that there are objects, the object extraction unit 23 extracts all the coordinates (θa, ha) of the objects included in the range (ST503).

Figure 10:
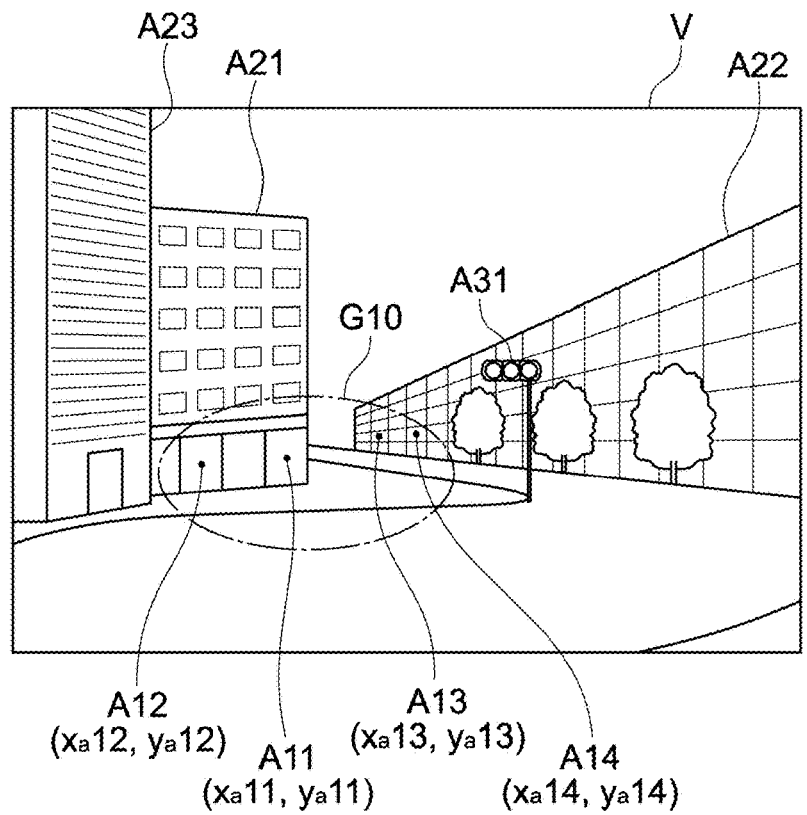
FIG. 10 is a diagram showing a field of view before the drawing processing is executed.

FIG. 10 is a diagram showing the field of view V before the drawing processing is executed.

In the example shown in this figure, the object extraction unit 23 extracts an eating place A11, an eating place A12, an eating place A13, and an eating place A14, and also a building A21, a building A22, a building A23, and an intersection A31.

Subsequently, the object distribution calculation unit 24 calculates the distribution of the objects distributed in the field of view V (ST503). As described using FIG. 9, the object distribution calculation unit 24 calculates local coordinates (xa, ya) of the extracted objects within the field of view V from the coordinates (θa, ha) on the cylindrical coordinates C0.

In the example shown in FIG. 10, the positions of the objects A11 to A14 at local coordinates are calculated as local coordinates (xa11, ya11), (xa12, ya12), (xa13, ya13), and (xa14, ya14), respectively.

Subsequently, the group management unit 25 groups the plurality of objects distributed in the field of view V (ST504).

In the example shown in FIG. 10, the group management unit 25 groups the four objects A11 to A14 in the field of view V as a group G10, the four objects A11 to A14 having associated additional information of an "eating place". In this case, the associated additional information is an attribute of the objects. Note that in this example of operation the group management unit 25 does not group the building A21, the building A22, the building A23, and the intersection A31.

Subsequently, the mode switching unit 26 determines whether the first mode is set or not (ST505). In this embodiment, the mode switching unit 26 can determine the current mode in view of the mode when the processing is started and of the presence or absence of a user's input operation corresponding to the mode switching via the input operation unit 204.

When it is determined that the first mode is set (No in ST505), the distribution display generation unit 27 generates a distribution display. The distribution display has a shape associated with a shape of the region in which the grouped objects are distributed, and is displayed near the region in which those objects are distributed (ST506). Thus, the controller 20 controls the display unit 11, so that the distribution display is presented to the user.

Subsequently, the AR icon display processing unit 28 executes processing of displaying AR icons for the group G1, the building A21, the building A22, the building A23, and the intersection A31 that are distributed in the field of view V (ST507).

Figure 11:
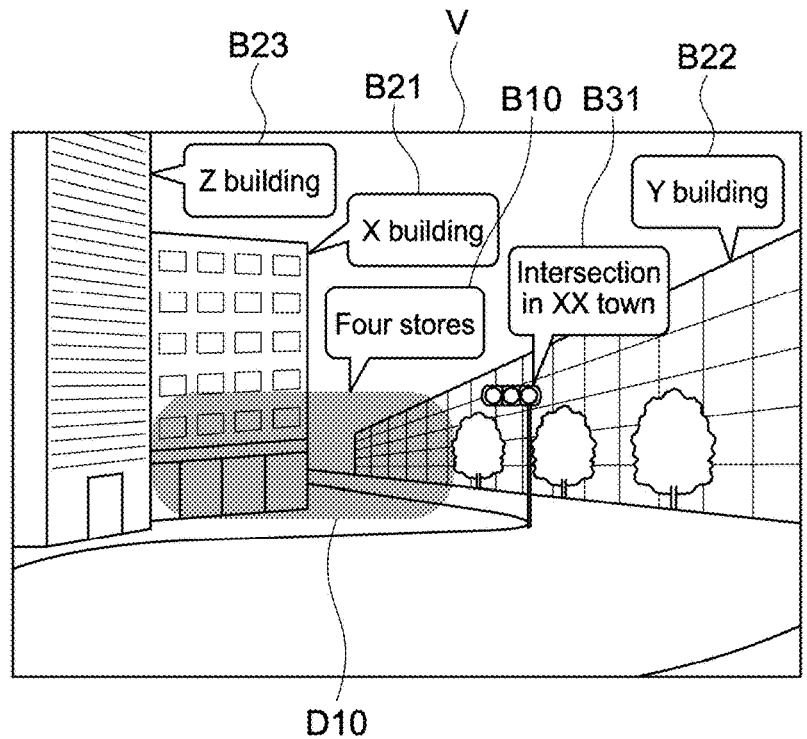
FIG. 11 is a diagram showing a field of view in which the drawing processing is executed in a first mode.

FIG. 11 is a diagram showing the field of view V on which the drawing processing is executed in the first mode.

As shown in the figure, a distribution display D10 is displayed on the grouped objects A11 to A14 in a superimposed manner.

For example, the AR icon display processing unit 28 calculates the region of the distribution display D10 and displays an AR icon B10 associated with the group G10 at a position along the upper portion of the distribution display D10.

In the AR icon B10, the number of stores may be displayed as shown in the figure, or an attribute common to the objects included in the group or the like may be displayed. Further, in a case where there is no attribute common to all of the objects but there is a statistically significant attribute, the attribute may be displayed.

As shown in the figure, the AR icon display processing unit 28 displays AR icons B21, B22, B23, B24, and B31 that are respectively associated with the building A21, the building A22, the building A23, and the intersection A31 at appropriate positions. As shown in the figure, for example, names of the buildings and the intersection can be displayed in the AR icons B21, B22, B23, B24, and B31.

Meanwhile, when it is determined in ST505 that the first mode is not set (No in ST505), the AR icon display processing unit 28 determines the second mode and executes processing of displaying AR icons for the respective grouped objects (ST507).

Figure 12:
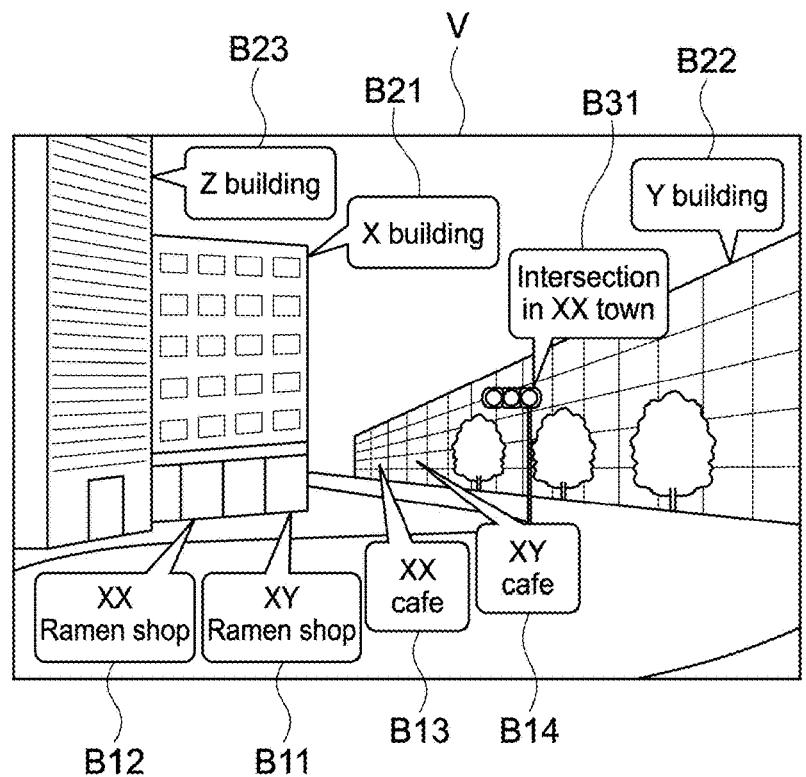
FIG. 12 is a diagram showing a field of view in which the drawing processing is executed in a second mode.

FIG. 12 is a diagram showing the field of view V on which the drawing processing is executed in the second mode.

As shown in the figure, the AR icon display processing unit 28 can generate and display AR icons B11, B12, B13, and B14 that are associated with the respective grouped objects A11 to A14. As shown in the figure, those AR icons B11 to B14 can display store names or the like of the respective objects.

Further, the AR icon display processing unit 28 may adjust positions of the AR icons such that the AR icons B11 to B14 do not overlap with one another.

As described above, according to this example of operation, the distribution display can be displayed on the grouped object in the first mode, and the grouped objects can be broken down and displayed in the second mode.

Subsequently, detailed processing of generating the distribution display will be described.

(Processing of Generating Distribution Display)

In this embodiment, the distribution display generation unit 27 can generate the distribution display by using a probability density function, the probability density function using, as a variable, the coordinates indicating a position of each of the grouped objects in the field of view. For example, the probability density function can be a Gaussian function.

Figure 13:
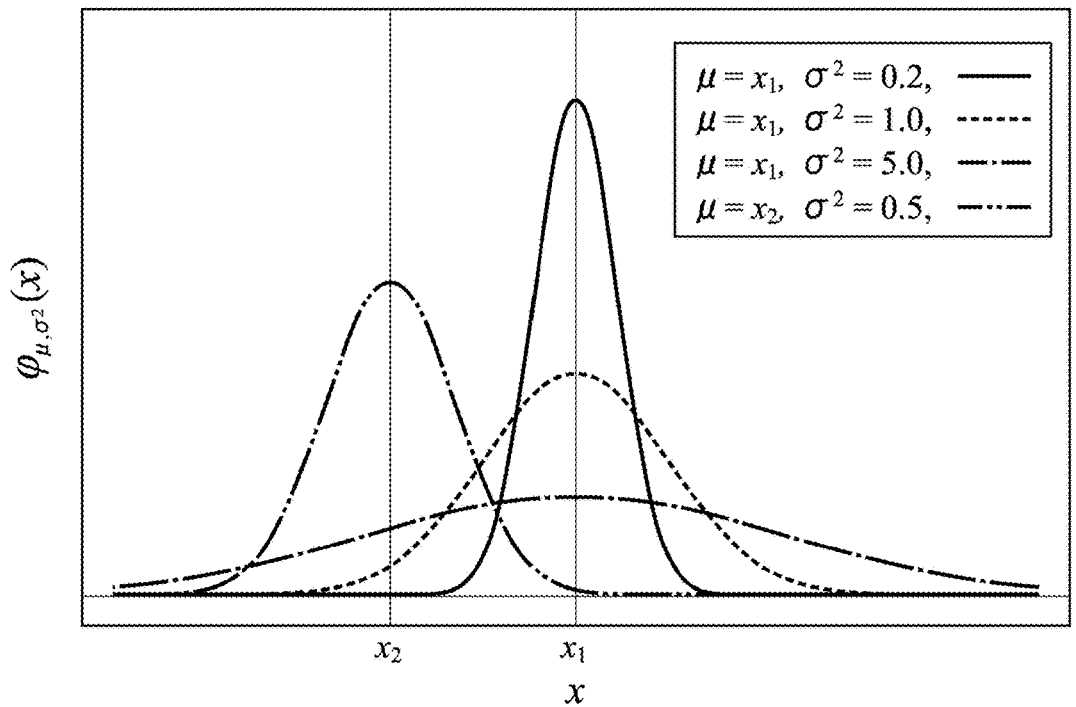
FIG. 13 is a graph showing an example of a Gaussian function, in which the vertical axis represents x, and the horizontal axis represents a distribution probability ψ (x).

FIG. 13 is a graph showing an example of the Gaussian function, in which the vertical axis represents x, and the horizontal axis represents a distribution probability ψ (x). The Gaussian function shown in the figure is a normal distribution function as one of Gaussian functions and is expressed by the following expression (5).

$$\varphi_{\mu,\sigma^2}(x) = \frac{1}{\sqrt{2\pi}\,\sigma} \exp\left\{-\frac{(x-\mu)^2}{2\sigma^2}\right\} \tag{5}$$

Hereinafter, with use of an example of the objects A11 to A14 shown in FIG. 10, a method of deriving a normal distribution function ψ (x) will be described.

Firstly, the distribution display generation unit 27 calculates an average value μ and a standard deviation σ from values of x (xa11, xa12, xa13, xa14) of the respective objects A11 to A14 on the local coordinates. The μ and σ thus calculated are substituted into Expression (5), to derive a normal distribution function ψ (x) in the x-axis direction.

The value of ψ (xa) represents a relative likelihood when xa is used as a probability density variable, i.e., represents a virtual density of objects in a minute interval including xa.

Here, the density of objects refers to the degree indicating a congestion level of objects. Specifically, the density of objects is a concept including the number of objects per unit region (actual density) or dispersion of the coordinates indicating the positions of the objects in the field of view.

In the example shown in FIG. 10, the coordinates of the objects are discretely distributed, and it is not realistic to calculate the actual density. In this regard, it is assumed that the density of objects is specified by a value of dispersion ($\sigma^2$) in this example.

Further, with reference to FIG. 13, as $\sigma^2$, i.e., dispersion is smaller, the curve of the graph is steeper, and the value of ψ is larger at about the average value μ. In such a manner, the graph also shows that the dispersion has a correlation with the density.

Meanwhile, the distribution display generation unit 27 similarly derives a normal distribution function ψ (y) for the y-axis direction. In other words, the distribution display generation unit 27 calculates an average value μ and a standard deviation σ from values of y (ya11, ya12, ya13, ya14) of the respective objects A11 to A14 on the local coordinates and obtains a normal distribution function ψ (y) in the axis direction.

The distribution display generation unit 27 then generates a distribution display that is displayed near the region in the field of view, in which a distribution probability (existence probability) of the objects has a predetermined value or more when the derived ψ (x) and ψ (y) are each integrated by a variable.

For example, the distribution probability of the objects can be derived by integrating the probability density function ψ (x) in a predetermined range with respect to the variable x. Therefore, integral ranges [xd1, xd2], [yd1, yd2] corresponding to a predetermined distribution probability are obtained, and thus the above region can be extracted.

For example, when the variable is x, the integral ranges can be specified as ranges of the following expression (6).

$$[xd1, xd2] = [\mu - k\sigma, \mu + k\sigma] (k > 0) \quad (6)$$

According to Expression (6), the distribution probability can be specified by only a value of k irrespective of the outline of the graph.

For example, when k=0.6745 is substituted into Expression (6), an integral result of ψ (x) is 0.5, and the distribution probability of the objects in an interval expressed by Expression (6) is 50%. Similarly, for example, when k=1 is substituted, the distribution probability of the objects in the interval expressed by Expression (6) is 68.27%. In this manner, when the value of k of Expression (6) is set, the range of x (and y) in which the distribution probability of the objects has a predetermined value can be derived.

Note that, in addition to the example in which the integral range described above are derived, the distribution display generation unit 27 may extract the ranges of variables x and y corresponding to ψ (x) and ψ (y) having a predetermined value or more, and generate a distribution display that is displayed near a region in the field of view corresponding to those ranges, for example.

As shown in FIG. 11, the distribution display is a graphic that is superimposed in the extracted ranges of x and y. With such a distribution display, the distribution of a plurality of objects can be expressed by the shape.

Further, although the distribution display may be rectangular, for example, as shown in the figure, all or a part of the periphery can be formed by a smooth curve.

Additionally, the distribution display generation unit 27 can generate a distribution display having a transmittance at which the plurality of objects are viewable. Thus, a distribution display expressed like fog or cloud covering the objects can be generated.

Distribution Display Generation Example 1

Figure 14:
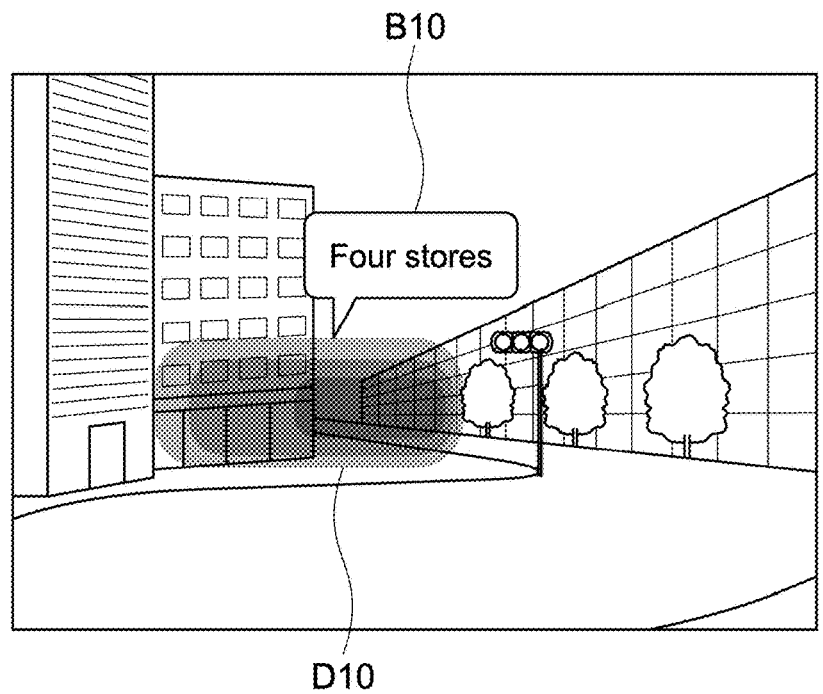
FIG. 14 is a diagram showing another example of the distribution display.

FIG. 14 is a diagram showing another example of the distribution display.

As shown in the figure, the distribution display generation unit 27 may change at least any one of hue, brightness, and saturation in the distribution display on the basis of the value of ψ or the range of the value of k of Expression (6). For example, in the distribution display, a region having a larger value of ψ, that is, a region having a higher density can be configured to have a color tone with a higher brightness or a color tone with a lower brightness. Alternatively, the hue may be changed in accordance with the value of ψ.

Thus, the distribution display generation unit 27 can generate the distribution display so as to change the color tone on the basis of the density of the grouped objects.

Further, as shown in the figure, the color tone of the distribution display may be changed in a stepwise manner or changed consecutively.

Distribution Display Generation Example 2

Figure 15:
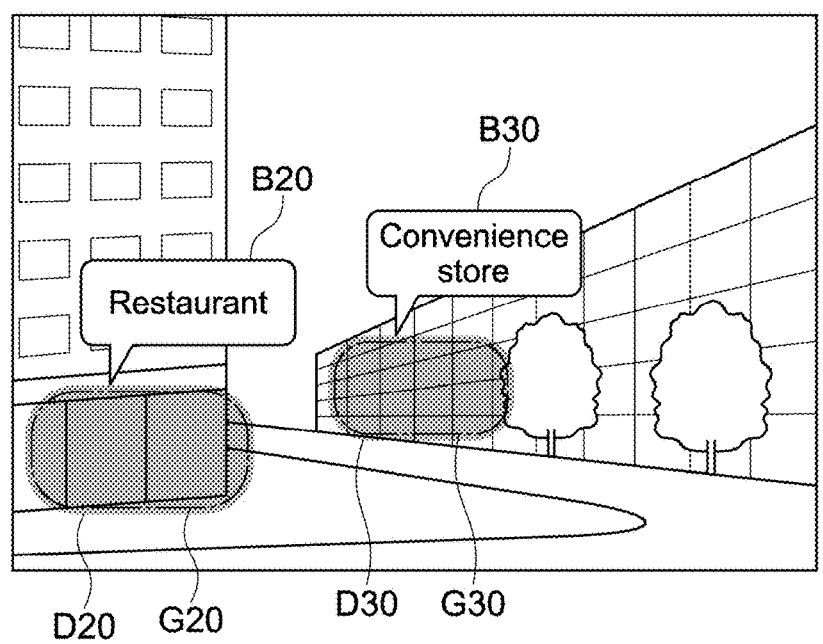
FIG. 15 is a diagram showing still another example of the distribution display.

FIG. 15 is a diagram showing still another example of the distribution display.

As shown in the figure, in the case where there are a plurality of groups, the distribution display generation unit 27 can generate the distribution display for each of the groups.

In the example shown in the figure, a group G20 includes objects having an attribute of restaurant, and a group G30 includes objects having an attribute of convenience store. Distribution displays D20 and D30 are respectively superimposed on those groups. Further, AR icons B10 and B20 are respectively added to the groups G20 and G30.

Thus, even in a case where a plurality of objects having different attributes are distributed in the field of view or where the distribution of a plurality of objects is biased, a suitable distribution display can be presented to the user.

Distribution Display Generation Example 3

Figure 16:
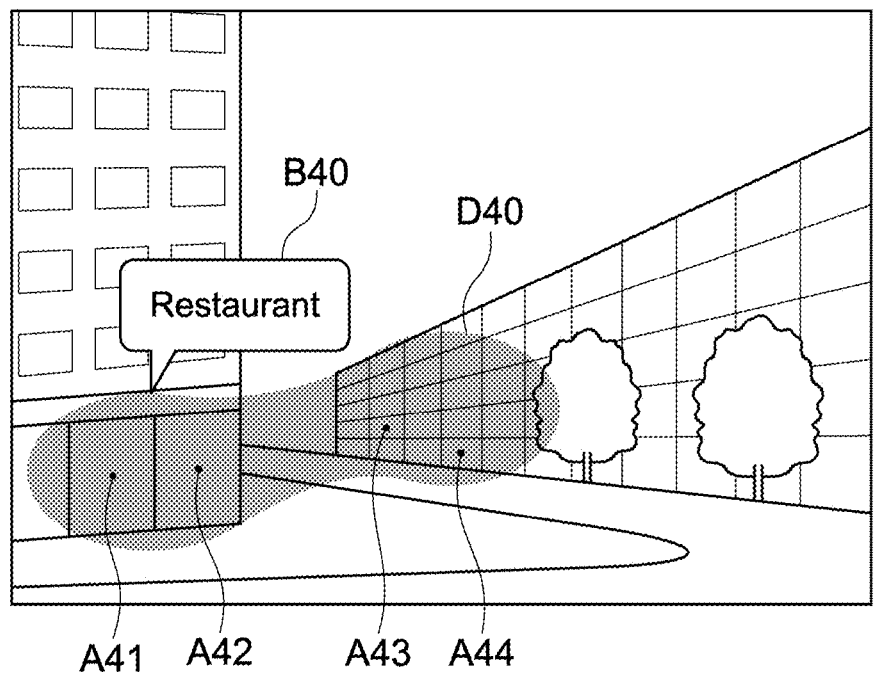
FIG. 16 is a diagram showing still another example of the distribution display.

FIG. 16 is a diagram showing still another example of the distribution display. Reference symbols A41 to A44 in the figure represent objects.

In a case where a group includes a plurality of regions congested with objects, when one probability density function is used, a suitable distribution display showing the distribution of the objects cannot be obtained.

In this regard, the distribution display generation unit 27 can generate a distribution display D40 having a shape expressing a biased distribution of the objects in the group.

More specifically, the distribution display generation unit 27 may determine whether there are small groups each including a plurality of objects whose density is a predetermined reference or more, out of the grouped objects. When it is determined that there are small groups, the distribution display generation unit 27 can derive a probability density function for each small group, the probability density function using, as a variable, coordinates indicating a position of each of the objects in the field of view that belong to each small group, and can generate a distribution display by using a probability density function obtained by the sum of the derived probability density functions.

In this case, the distribution display generation unit 27 may determine whether there are small groups each including a plurality of objects whose dispersion has a predetermined value or less, out of the grouped objects, similarly to Modified example 1-1 to be described later.

Thus, as shown in the figure, a distribution display having a shape corresponding to the distribution of the objects can be generated.

Action and Effect of this Embodiment

As described above, according to this embodiment, when a plurality of objects are grouped, and a distribution display displayed near a region in which the objects are distributed is generated, it is possible to allow the user who visually recognizes the field of view V to intuitively understand the distribution of the objects. Therefore, even when there are a plurality of objects in the field of view V, information can be provided in a simple style and visibility can be improved.

For example, when the user observes the reality space via the field of view, in providing information by an AR icon displaying content of an object with use of characters or the like, the content of the AR icon cannot be sufficiently recognized. Further, when the proportion of the AR icon in the field of view is larger, the observation on the reality space may be hindered, and when the user observes the AR icon, attention to the reality space may be distracted. Hereinafter, a specific example will be described.

Figure 17:
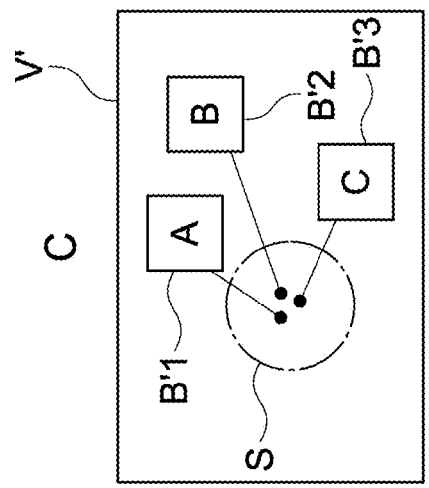
FIG. 17 is a diagram schematically showing a field of view according to a reference example of the first embodiment.
Figure 17:
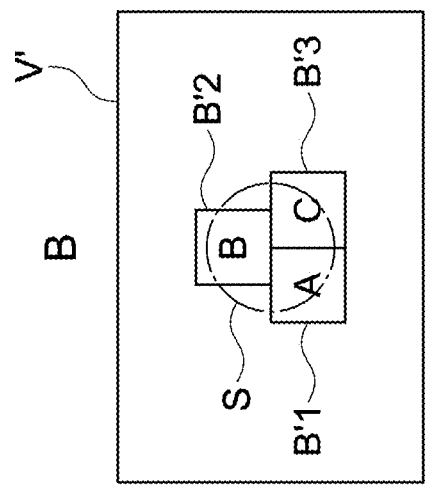
Figure 17:
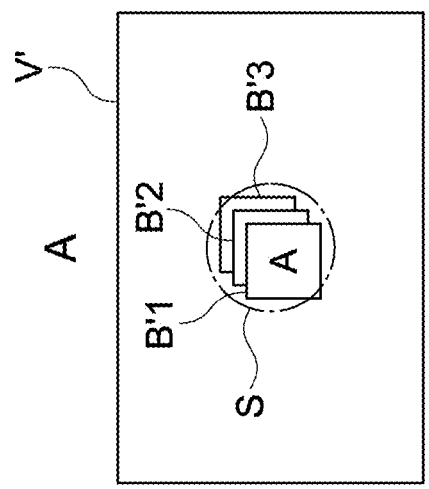
Figure 18:
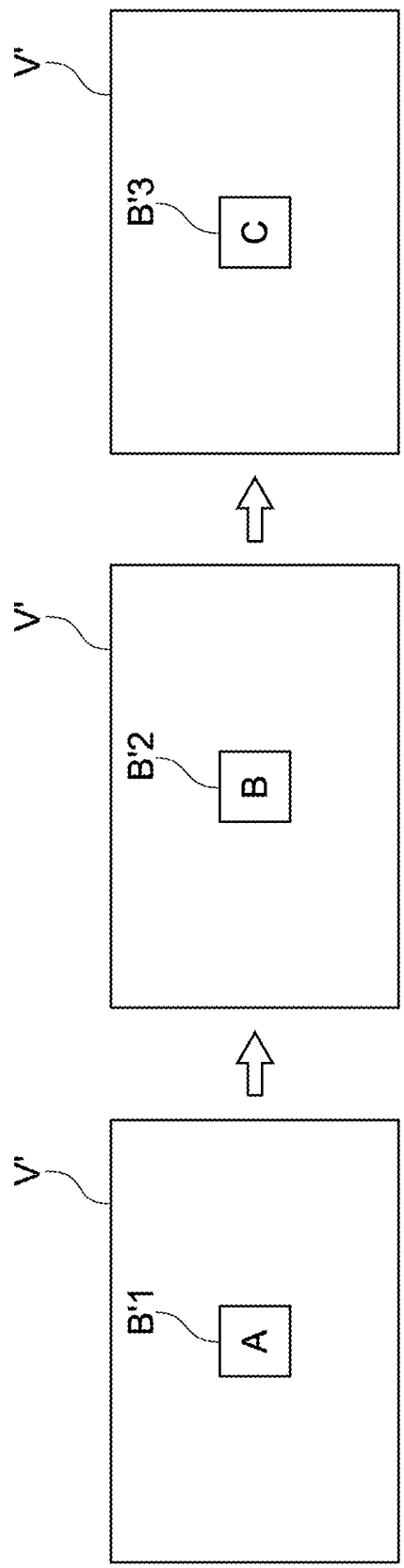
FIG. 18 is a diagram schematically showing a field of view according to the reference example of the first embodiment.

FIGS. 17 and 18 are each a diagram schematically showing a field of view according to a reference example of this embodiment.

In each field of view V' shown in FIGS. 17 and 18, three objects (not shown) are disposed in a region S, and AR icons B'1, B'2, and B'3 associated with the three objects are displayed.

In the field of view V' shown in A of FIG. 17, the AR icons B'1, B'2, and B'3 are superimposed for display, and the user cannot grasp content of the AR icons B'2 and B'3.

In this regard, in the field of view V' shown in B of FIG. 17, the AR icons B'1, B'2, and B'3 are displayed so as not to overlap with one another. In this case, the proportion of the AR icons B'1, B'2, and B'3 in the field of view V' becomes high. For that reason, when the user wants to observe an object or the like in the reality space, the AR icons B'1, B'2, and B'3 may be superimposed on that object and may hinder the user from observing the object. Further, depending on the control method, there is a risk that the distribution of objects associated with the AR icons B'1, B'2, and B'3 or correspondence relationships between the AR icons and the objects are made unclear.

In the field of view V' shown in C of FIG. 17, objects and the AR icons B'1, B'2, and B'3 associated therewith are connected by respective lines, and correspondence relationships therebetween are made clear and the arrangement of the objects is also made clear. Meanwhile, when the user wants to observe an object or the like in the reality space, the presence of the AR icons B'1, B'2, and B'3 may still hinder the user from observing the object.

In the field of view V' shown in FIG. 18, the AR icons B'1, B'2, and B'3 are switched at a predetermined timing. In this case, if the switching timing is insufficiently ensured, the user cannot be made to visually recognize the AR icons B'1, B'2, and B'3. Meanwhile, in order to visually recognize all of the AR icons B'1, B'2, and B'3, it is necessary to continuously observe the AR icons for a certain period of time.

According to the first mode in this embodiment, those problems can be eliminated.

In other words, according to the first mode in this embodiment, since the distribution display is displayed on a plurality of objects in a superimposed manner, it is not necessary to display an AR icon corresponding to each of the objects. Therefore, the proportion of AR display in the field of view is lowered, and the observation on the reality space is not hindered. Additionally, since the distribution display can show the distribution of the objects by shape or the like, the distribution display can be provided with a configuration having permeability. Thus, visibility of the reality space can be more improved.

Further, since the distribution display can express the distribution or density of a plurality of objects by the shape or color tone, the user can be allowed to grasp the presence of the objects and a distribution state thereof in an intuitive and simple manner. Therefore, the user can grasp the minimum information on the objects for a short period of time by the distribution display.

Additionally, since the user can vaguely grasp the distribution of the objects or the like by the distribution display without observation, attention to the reality space can be kept.

In addition to the above, in this embodiment, since the first mode can be switched to the second mode, the user can acquire more detailed information of the objects as needed.

Figure 19:
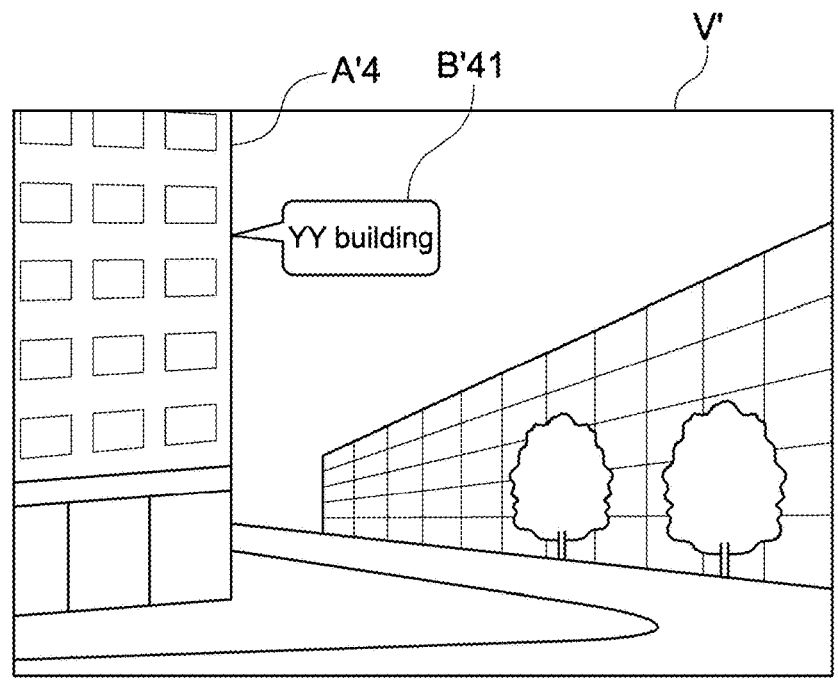
FIG. 19 is a diagram schematically showing a field of view according to another reference example of the first embodiment.
Figure 19:
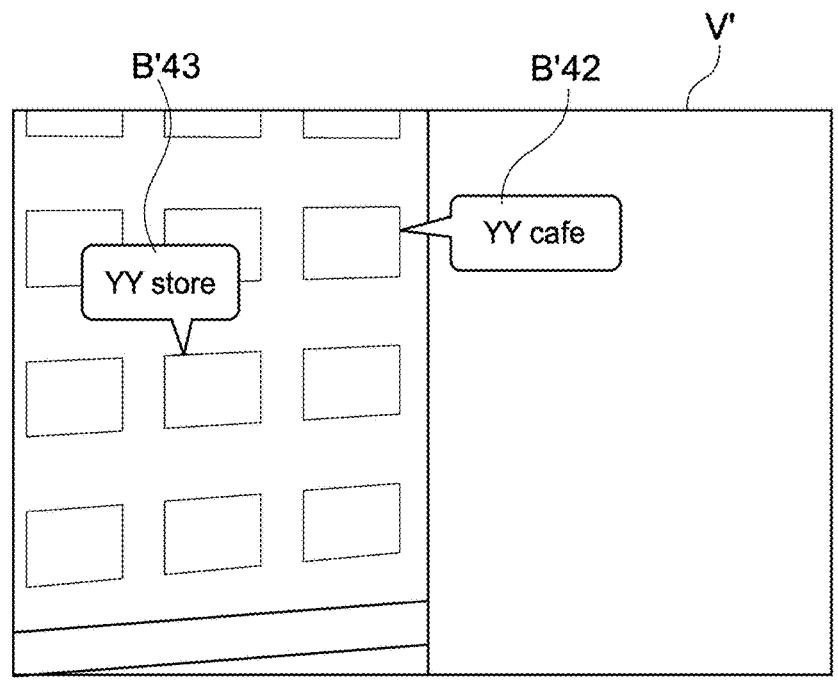

FIG. 19 is a diagram schematically showing a field of view according to another reference example of this embodiment.

In a field of view V' shown in A of FIG. 19, an AR icon B'41 associated with a building A'4 including stores such as eating places is displayed. When the user approaches this building A'4, as shown in B of FIG. 19, AR icons B'42 and B'43 displaying the names of stores such as eating places, which are lower-order information, are displayed. In other words, the example shown in FIG. 19 is configured as follows: in a case where the AR icons are congested or overlaid when displayed for the respective objects, the AR icon B'41 on information of a higher-order hierarchy is displayed; and as the degree of congestion of the AR icons is relieved, the AR icons B'42 and B'43 on information of a lower-order hierarchy are displayed.

In this case, the controller 20 needs to acquire information on the hierarchies of the objects, and it is necessary to prepare the hierarchies of the objects.

According to this embodiment, even in a case where information of a hierarchy of an object is insufficient, e.g., an object newly registered in the AR server 40 or the like, the object can be a target of grouping. Thus, information of more objects can be quickly provided, and the amount of processing for preparing the hierarchy can be lightened.

Application Example of AR System

In the example of operation described above, the example in which the AR system 100 (controller 20) is applied to the eating-place search application program (hereinafter, abbreviated as application) has been described, but the AR system 100 in this embodiment can be applied to another application.

Application Example 1

The AR system 100 can be applied to, for example, a crowded spot search application. It is assumed that the crowded spot search application can present a place, in which persons staying out are concentrated, to the user in real-time. In this case, the objects are persons staying out.

For example, the AR server 40 stores a database on a population of persons staying out, as the object database 404. The AR server 40 acquires a current position of each person and position information of a registered home of that person from, for example, portable information terminals of a plurality of persons and calculates a distance from the home of each person. Further, the AR server 40 acquires a behavior analysis result of each person, which is analyzed by a behavior analysis program or the like installed in the portable information terminal of each person. The AR server 40 determines whether each person stays out or not on the basis of the acquired pieces of information. Further, the current position and the staying-out status, which are associated with each person, are stored in the database on a population of persons staying out.

The controller 20 acquires information on a person who stays out from the AR server 40 via the portable information terminal 30. The object extraction unit 23 then extracts persons staying out who are distributed in the field of view V, and the object distribution calculation unit 24 calculates the distribution of those persons. Subsequently, the group management unit 25 groups the persons staying out, and the distribution display generation unit 27 generates a distribution display. The distribution display generation unit 27 may have a different color tone in accordance with a density, for example.

Figure 20:
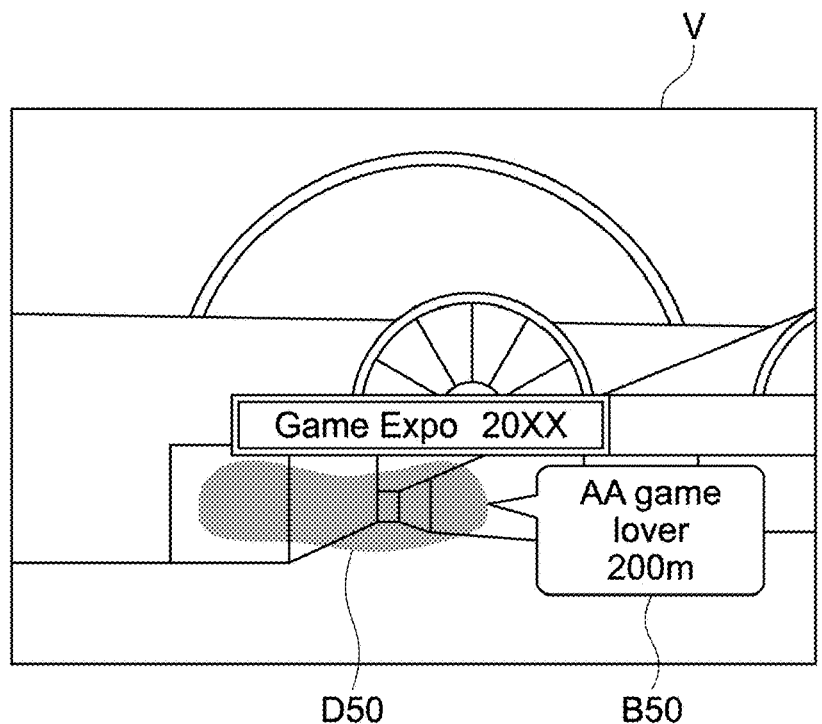
FIG. 20 is a diagram showing an example of a field of view presented by processing of an application program described in Application example 1 of the first embodiment.

FIG. 20 is a diagram showing an example of a field of view V presented by the processing of this application.

In the field of view V shown in the figure, a certain event venue is presented, and a distribution display D50 is displayed. In such a manner, according to this embodiment, even when objects (persons) cannot be visually recognized in the field of view V, the distribution display D50 can be displayed in a region in which those objects are distributed.

For example, in the example shown in the figure, information of an attribute of users as "certain game lover" and information of a distance to that group are presented by an AR icon B50.

In such a manner, in a case where there is a statistically significant attribute among predetermined attributes of the grouped persons, the AR icon display processing unit 28 can display such an attribute as the AR icon B50. Further, the AR icon display processing unit 28 may display a distance from the user wearing the HMD 10 to the group, in addition to the attribute. In this case, the distance to the group can be an average distance of the distances of the grouped persons from the user wearing the HMD 10.

Thus, the user wearing the HMD 10 can easily search for a place where there are many people or many users having a common hobby with the user also in an event venue that the user has visited for the first time or the like. Additionally, the user can act while avoiding the crowds on the basis of a user's intension.

Further, for example, if the user previously registers the information on "certain game lover", the group management unit 25 can group persons having the registered attribute of "certain game lover". This can provide more effective information to the user.

Application Example 2

The AR system 100 can be applied to, for example, a photography spot search application. It is assumed that the photography spot search application can present a direction or a distance of a place suitable for photography when viewed from the user. In this case, the object is a place for photography.

For example, the AR server 40 stores a photography spot database as the object database 404. Image data photographed by a digital camera or a portable information terminal (hereinafter, referred to as picture data) are uploaded to a photo-sharing site on the Internet 50, a blog on the Internet 50, or the like. The AR server 40 acquires photographic position information that is added to those pieces of picture data as metadata. The photographic position information is, for example, acquired at photography by a photographic apparatus including the GPS communication unit 305. The AR server 40 holds the acquired photographic position information as the photography spot database.

The controller 20 acquires the photographic position information from the AR server 40 via the portable information terminal 30. The object extraction unit 23 then extracts photography spots distributed in the field of view V, and the object distribution calculation unit 24 calculates the distribution of those photography spots. Subsequently, the group management unit 25 groups those photography spots, and the distribution display generation unit 27 generates a distribution display. The distribution display generation unit 27 may have a different color tone in accordance with a density, for example.

Figure 21:
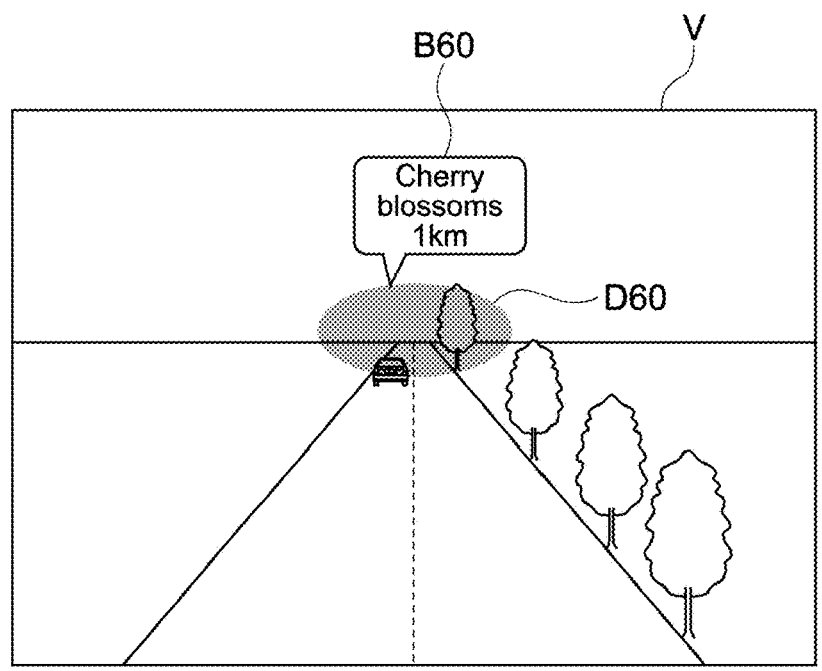
FIG. 21 is a diagram showing an example of a field of view presented by processing of an application program described in Application example 2 of the first embodiment.

FIG. 21 is a diagram showing an example of a field of view V presented by the processing of this application.

In the field of view V shown in the figure, a distribution display D60 representing the distribution of photography spots is displayed. Above the distribution display D60, information indicating content of a subject in a photography spot, "Cherry blossoms", and information of a distance to that spot are presented by an AR icon B60. The information indicating content of a subject in a photography spot can be obtained by an image analysis of the picture data, for example.

This enables the user to grasp the direction or distance of a photography spot, the degree of popularity of the photography spot, or the like.

Additionally, in a case where there is a statistically significant season among photography seasons in photography spots out of the extracted photography spots, the group management unit 25 can group photography spots that are processed in the moment close to the significant photography season. The photography season can be identified from the metadata added to the picture data.

For example, with reference to the example of FIG. 21, it is assumed that a photography season having cherry blossoms as a subject is concentrated mainly in the end of March to the start of April in that photography area. In this case, when the processing is performed at the start of April, the controller 20 can group imaging spots having the cherry blossoms as a subject and can generate a distribution display D60 shown in the figure. Meanwhile, when the processing is performed in August, the controller 20 does not group the imaging spots having the cherry blossoms as a subject and does not generate the distribution display D60.

This enables the user to grasp a realistic photography spot suitable for photography.

Application Example 3

The AR system 100 can be applied to, for example, a sightseeing spot guide application. It is assumed that the sightseeing spot guide application can present a direction or a distance of a sightseeing spot near the current location when viewed from the user. In this case, the object is a sightseeing spot.

For example, the AR server 40 stores a sightseeing spot database as the object database 404. The AR server 40 acquires, as information of a sightseeing spot, information uploaded to a homepage created by a municipality, a tourist association, or the like and information uploaded to a blog.

The controller 20 acquires information of a sightseeing spot from the AR server 40 via the portable information terminal 30. The object extraction unit 23 then extracts sightseeing spots distributed in the field of view V, and the object distribution calculation unit 24 calculates the distribution of those sightseeing spots. Subsequently, the group management unit 25 groups those sightseeing spots, and the distribution display generation unit 27 generates a distribution display. The distribution display generation unit 27 may have a different color tone in accordance with a density, for example.

Figure 22:
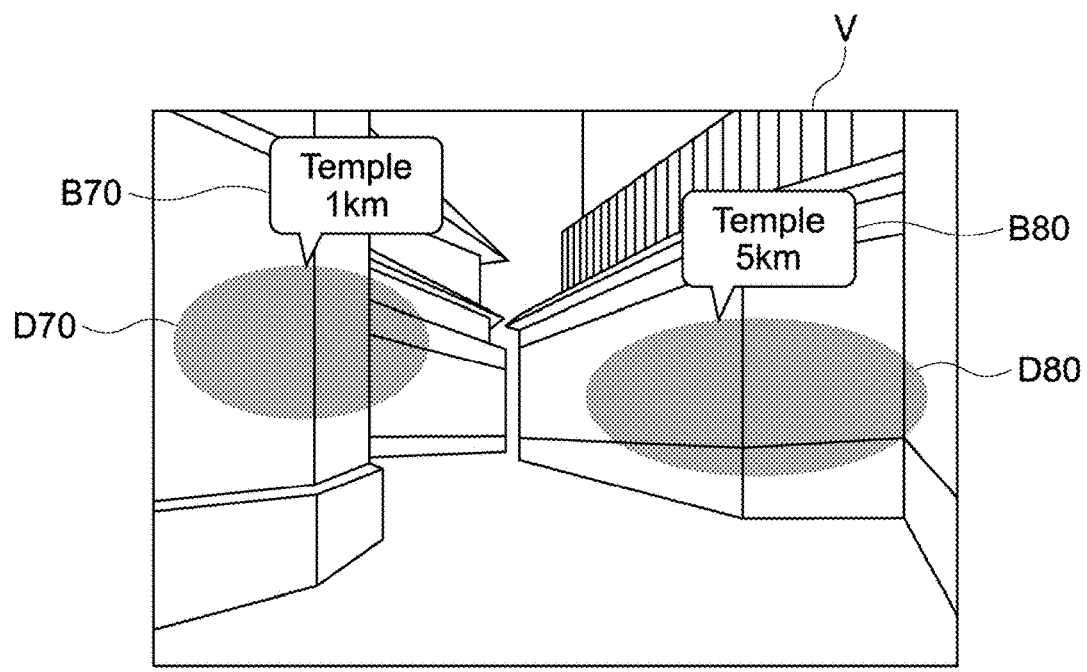
FIG. 22 is a diagram showing an example of a field of view presented by processing of an application program described in Application example 3 of the first embodiment.

FIG. 22 is a diagram showing an example of a field of view V presented by the processing of this application.

In the field of view V shown in the figure, distribution displays D70 and D80 representing the distribution of sightseeing spots are displayed. Above the distribution displays D70 and D80, AR icons B70 and B80 are respectively displayed. In the AR icons B70 and B80, information indicating an attribute of a sightseeing spot, "temple", and information of a distance to that spot are respectively presented.

This enables the user to grasp the direction or distance of a sightseeing spot, the degree of concentration of the sightseeing spots, or the like.

Note that in a case where there is a statistically significant attribute among attributes of a plurality of sightseeing spots, the AR icon display processing unit 28 can display that attribute as an AR icon. With reference to FIG. 22, in a case where the group management unit 25 groups a gate, a main temple, and the like of a temple forming a predetermined density as a sightseeing spot, for example, the AR icon display processing unit 28 can display an attribute, "temple", which is common to the gate, the main temple, and the like of the temple, as a statistically significant attribute.

Additionally, in a case where each of the extracted sightseeing spots has a season suitable for sightseeing, the group management unit 25 can group sightseeing spots that are processed in the moment close to that season.

This enables the user to grasp a sightseeing spot suitable for a sightseeing season.

Application Example 4

The AR system 100 can be applied to, for example, a traffic jam information providing application. The traffic jam information providing application can present a place where there is a traffic jam to the user in real-time. In this case, the object is a car.

For example, the AR server 40 stores a traffic jam information database as the object database 404. The AR server 40 acquires distribution information of cars driven at a low speed by using, for example, running information issued by a car, a system installed on a road for monitoring a flow of cars, or a portable information terminal of a driver.

The controller 20 acquires the distribution information of cars from the AR server 40 via the portable information terminal 30. The object extraction unit 23 then extracts cars driven at a low speed, which are distributed in the field of view V, and the object distribution calculation unit 24 calculates the distribution of those cars. Subsequently, the group management unit 25 groups those extracted cars, and the distribution display generation unit 27 generates a distribution display. The distribution display generation unit 27 may have a different color tone in accordance with a density, for example.

Figure 23:
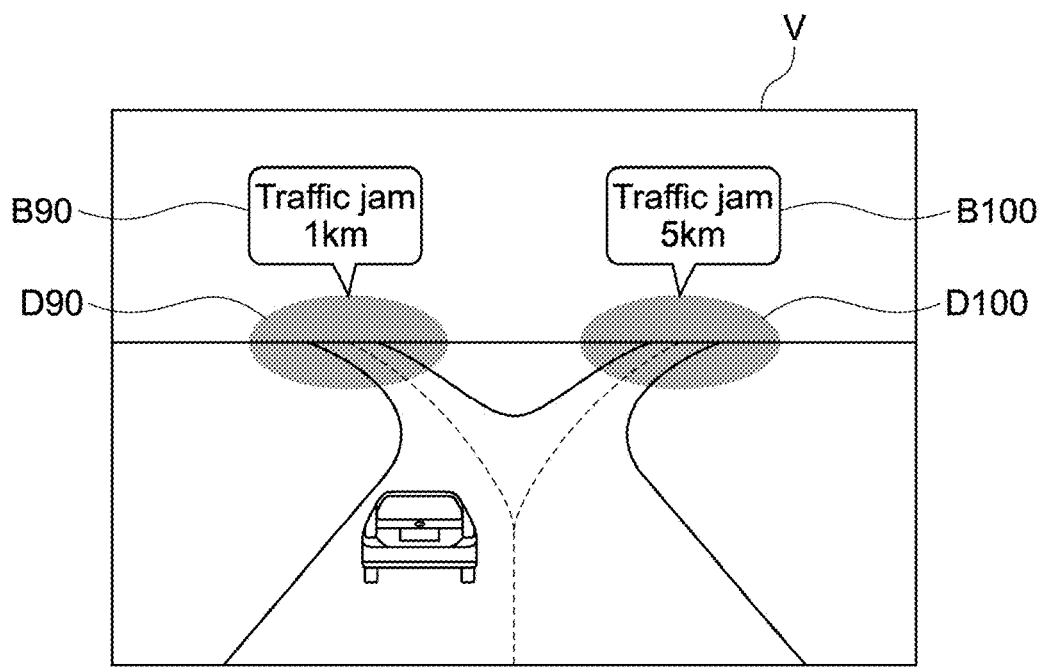
FIG. 23 is a diagram showing an example of a field of view presented by processing of an application program described in Application example 4 of the first embodiment.

FIG. 23 is a diagram showing an example of a field of view V presented by the processing of this application.

In the field of view V shown in the figure, distribution displays D90 and D100 representing the distribution of the cars driven at a low speed are displayed. Above the distribution displays D90 and D100, AR icons B90 and B100 are respectively displayed. In the AR icons B90 and B100, information of "traffic jam" and information of a distance to a position at which the traffic jam is started are respectively presented.

This enables the user to grasp the direction or distance of a location where there is a traffic jam or the degree of traffic jam and to avoid such a location where there is a traffic jam.

Other Application Examples

Further, the AR system 100 can also be applied to an application to search for an empty space in a parking lot. In this case, the controller 20 can generate a distribution display on the distribution of cars in a certain parking lot by similar processing of the traffic jam information providing application. This enables the user to grasp the distribution of congestion of cars in the parking lot and to easily find an empty space.

Modified Examples

Hereinafter, modified examples of this embodiment will be described. Note that in the following modified examples, configurations similar to those in the embodiment described above are denoted by identical reference symbols and description thereof will be omitted.

Modified Example 1-1

The above embodiment has described that the group management unit 25 groups a plurality of objects having additional information of an associated attribute or the like, but a condition for the grouping is not limited thereto.

For example, the group management unit 25 may group a plurality of objects forming a density of a predetermined reference or more out of a plurality of objects distributed in a field of view.

In this case, the group management unit 25 can group a plurality of objects whose dispersion has a predetermined value or less when a probability density function is derived, the probability density function using, as a variable, coordinates $(x_a, y_a)$ indicating a position of each object in a field of view.

Additionally, in this modified example, the group management unit 25 can restructure the group on the basis of a density of a plurality of objects distributed in a field of view.

Figure 24:
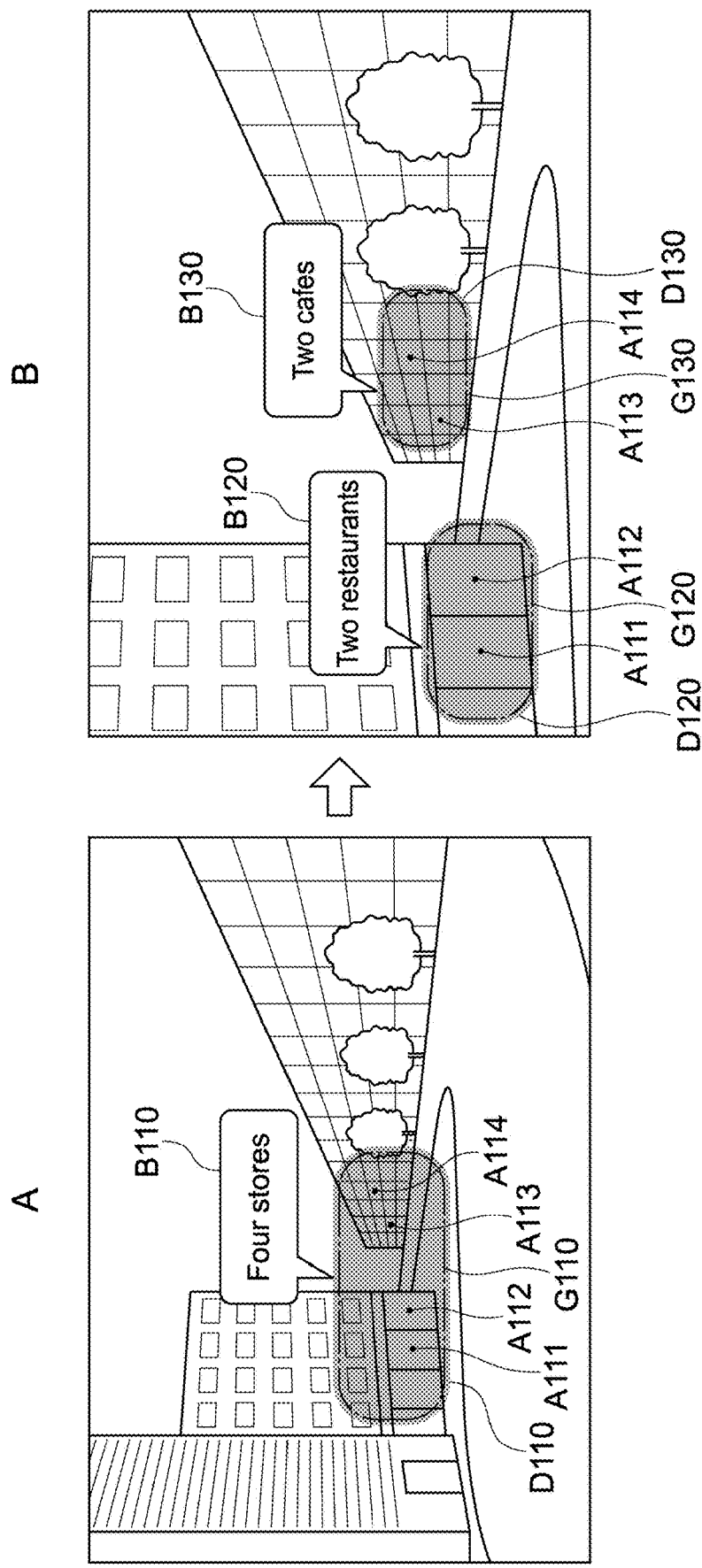
FIG. 24 is a diagram showing an example of a field of view according to Modified example 1-1.

A and B of FIG. 24 is a diagram showing an example of the field of view V and showing an example in which objects A111 to A114 are two restaurants A111 and A112 included in one building and two cafes A113 and A114 included in another building.

In A of FIG. 24, the four objects A111 to A114 are concentrated in a narrow range of the field of view V. The four objects A111 to A114 are grouped as one group G110, and a distribution display D110 is displayed.

Meanwhile, as shown in B of FIG. 24, in a case where the user approaches those buildings and the density of the objects is relieved, the dispersion of the distribution of the four objects A111 to A114 is larger than a reference value. In this case, the group management unit 25 searches for aggregate of objects whose dispersion of the distribution has a reference value or less. As shown in the figure, the two restaurants A111 and A112 and the two cafes A113 and A114 are restructured as groups G120 and G130, respectively. Additionally, the distribution display generation unit 27 generates distribution displays D120 and D130 for the respective groups G120 and G130.

Thus, according to this modified example, it is possible to generate a more suitable distribution display corresponding to the density and improve visibility of a field of view.

Modified Example 1-2

The distribution display generation unit 27 and the AR icon display processing unit 28 can perform processing of keeping a part of the generated AR icon or distribution display from being displayed.

Figure 25:
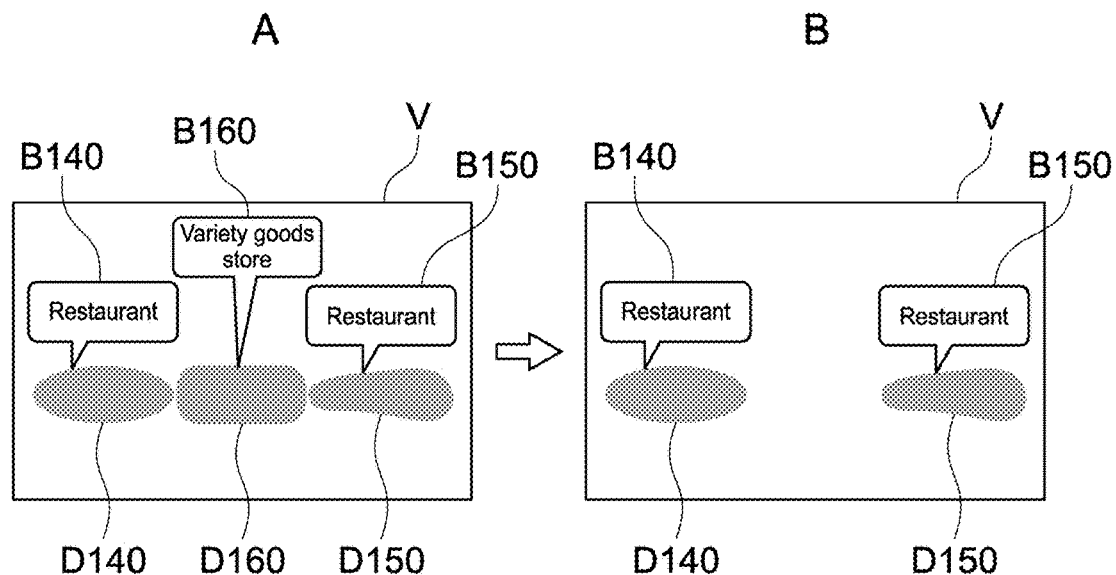
FIG. 25 is a diagram showing an example of a field of view according to Modified example 1-2.

For example, A of FIG. 25 shows an example in which the distribution display generation unit 27 and the AR icon display processing unit 28 generate a distribution display and an AR icon for variety goods stores. In the field of view V, distribution displays D140 and D150 displaying the distribution of restaurants and a distribution display D160 displaying the distribution of variety goods stores, and AR icons B140, B150, and 160 respectively corresponding thereto are displayed.

For example, when the user searches for an eating place, the importance of the variety goods stores is low.

In this regard, as shown in B of FIG. 25, the distribution display generation unit 27 and the AR icon display processing unit 28 may remove AR icons and distribution displays having attributes other than a predetermined attribute such as an eating place by filter processing.

The removal of AR icons and distribution displays may be performed on the basis of a user's input operation or may be automatically performed by an application.

This can realize providing of minimum information in a simpler style.

Modified Example 1-3

For example, the object extraction unit 23 may extract only an object having a predetermined attribute.

This can lower the amount of processing in the controller 20.

Modified Example 1-4

The above embodiment has described the example in which the distribution display is not generated in the second mode, but the present technology is not limited thereto. Also in the second mode, a distribution display can be generated for the grouped objects.

Figure 26:
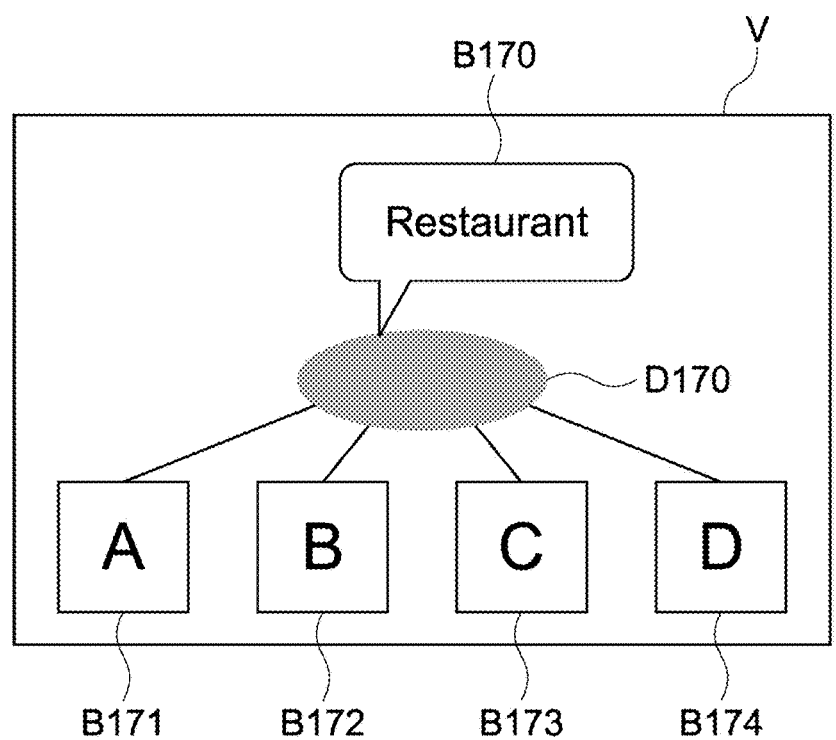
FIG. 26 is a diagram showing an example of a field of view in the second mode according to Modified example 1-4.

FIG. 26 is a diagram showing an example of the field of view V in the second mode. As shown in the figure, an AR icon B170 and a distribution display D170 are displayed for a group. Additionally, AR icons B171, B172, B173, and B174 corresponding to respective objects in the group are also displayed.

This can show the presence of a group also in the second mode.

Modified Example 1-5

The above embodiment has described that, when determining that a user's operation corresponding to mode switching is received by the input operation unit 204, the mode switching unit 26 switches between the first mode and the second mode, but the present technology is not limited thereto.

For example, when it is determined that the user is observing a distribution display, the mode switching unit 26 may be configured to switch from the first mode to the second mode.

More specifically, when it is determined that a distribution display to be described later is displayed at the center of the field of view V, the mode switching unit 26 may determine that the user is observing the distribution display.

Figure 27:
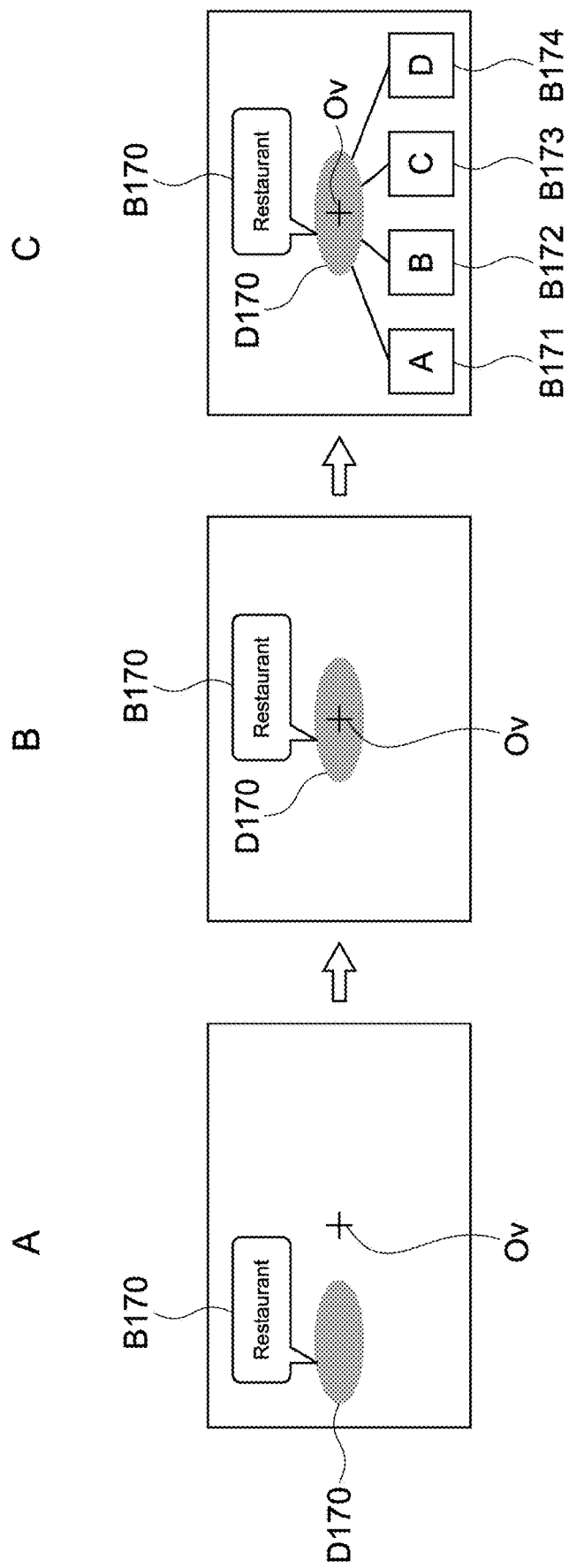
FIG. 27 is a diagram of a field of view showing an example of mode switching according to Modified example 1-5.

FIG. 27 is a diagram of the field of view V showing an example of the mode switching by the mode switching unit 26. A reference symbol Ov in the figure represents the center of the field of view V.

Firstly, as shown in A of FIG. 27, in the first mode, a distribution display D170 is displayed in a region deviated from the center Ov.

When the user changes the orientation of the head, i.e., the display unit 11 (head track), the range of θ in the field of view V in the cylindrical coordinates C0 also change.

Thus, as shown in B of FIG. 27, the distribution display D170 is displayed at the center Ov, and the mode switching unit 26 switches from the first mode to the second mode.

As shown in C of FIG. 27, AR icons B171, B172, B173, and B174 that presents information of objects included in the group are displayed.

It is thought that when the user intends to acquire detailed information of the group, the user observes the group. Therefore, in this modified example, switching to the second mode can be executed using a natural motion of the user when observing the group.

Note that the mode switching unit 26 may be configured to switch from the first mode to the second mode after the elapse of a predetermined period of time after the distribution display D170 is displayed at the center Ov.

Alternatively, the mode switching unit 26 may determine whether the user is observing the field of view V or not with use of a behavior recognition engine installed in the portable information terminal 30, a line-of-sight detection system mounted to the display unit 11, or the like.

Modified Example 1-6

As another example of the mode switching processing, when determining that the density of the grouped objects in the field of view V is a predetermined reference or less, the mode switching unit 26 may switch to the second mode.

In this modified example, for example, when the user approaches an object in the reality space, the dispersion of the distribution of the objects in the field of view V becomes large and the density is lowered, so that switching to the second mode can be performed.

Figure 28:
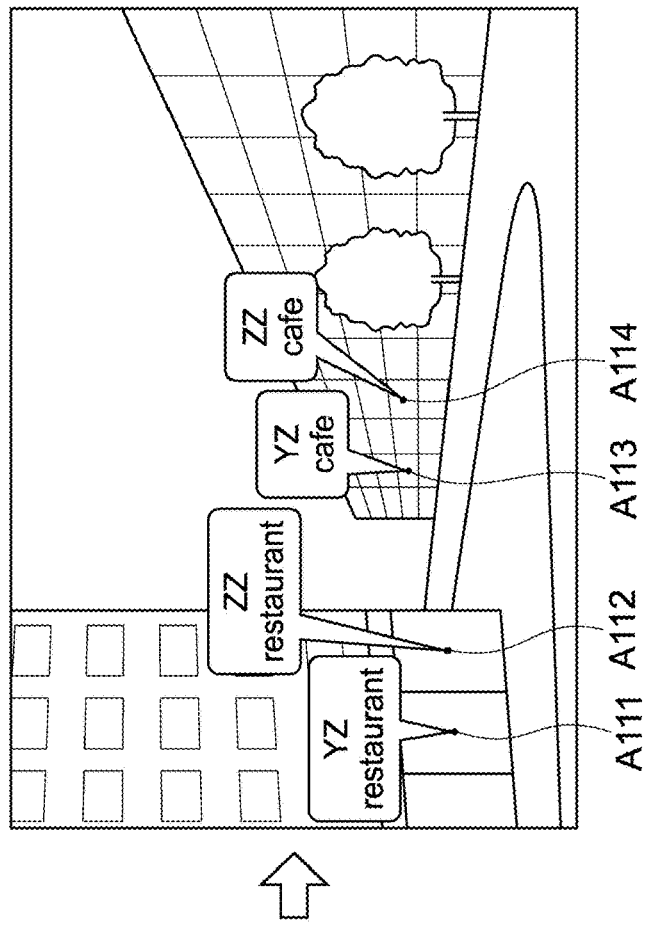
FIG. 28 is a diagram showing an example of a field of view according to Modified example 1-6.
Figure 28:
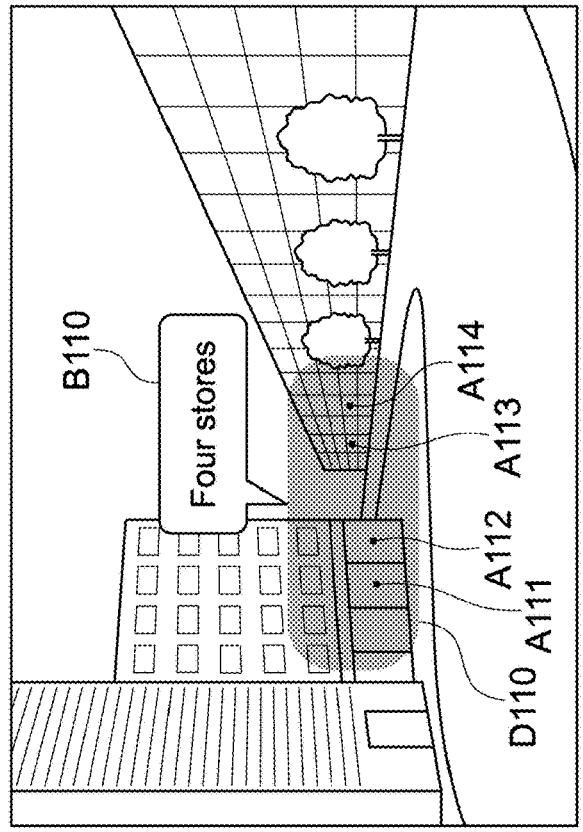

A and B of FIG. 28 is a diagram showing an example of the field of view V, in which the objects are four eating places.

A of FIG. 28 shows an example in which the density of the four objects A111 to A114 is larger than a predetermined reference and the first mode is maintained. For the reference of the density, for example, the value of the dispersion can be applied as in Modified example 1-1. In the example shown in the figure, a distribution display D110 and an AR icon B110 are displayed for the four grouped objects A111 to A114.

B of FIG. 28 shows an example in which the density of the four objects A111 to A114 is a predetermined reference or less, and switching to the second mode is performed. In the example shown in the figure, AR icons B111, B112, B113, and B114 are displayed for the four objects A111 to A114, respectively.

Here, in a case where the density of the objects is lowered, the objects A111 to A114 are distributed in a wider region in the field of view V. Thus, a space for displaying the AR icons B111 to B114 for the respective objects is easily ensured. Therefore, according to this modified example, the switching between the modes can be performed while maintaining the visibility of the AR icons in the field of view V.

Modified Example 1-7

The above embodiment has described that the distribution display generation unit 27 generates the distribution display by using the normal distribution function expressed by Expression (5). However, another Gaussian function expressed by the following expression (6) may be used.

$$\varphi_{\mu,\sigma^2}(x) = a\exp\left\{-\frac{(x-\mu)^2}{2\sigma^2}\right\} \tag{6}$$

By Expression (6) as well, the bell-shaped function shown in FIG. 13 can be obtained, and a distribution display similar to that of the embodiment described above can be generated.

Modified Example 1-8

Alternatively, the distribution display generation unit 27 may generate, for example, the following distribution display without using the probability density function.

Figure 29:
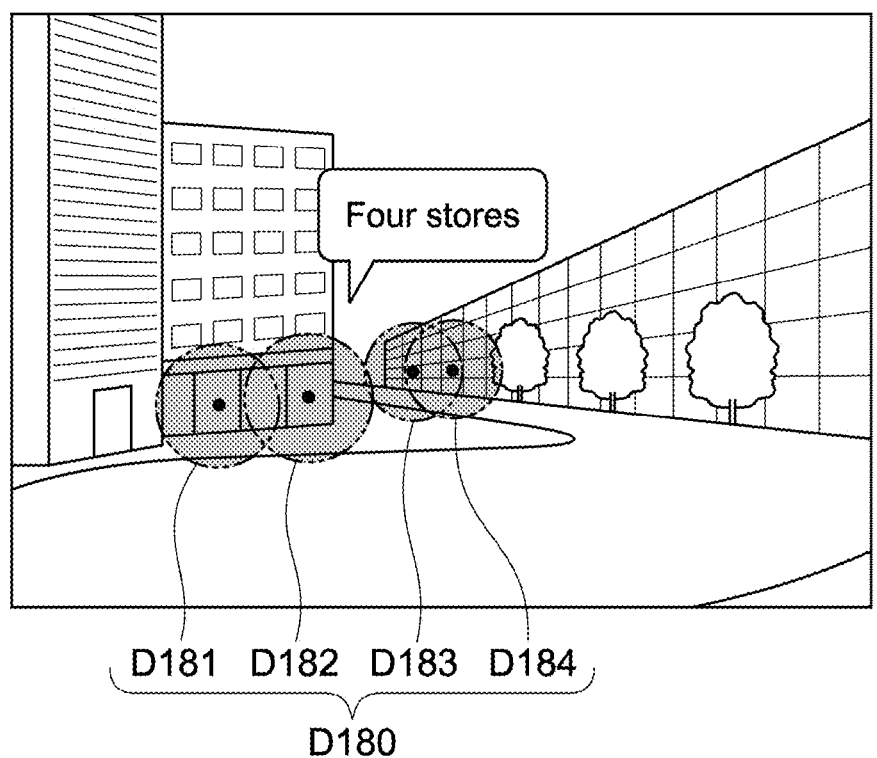
FIG. 29 is a diagram showing an example of a field of view according to Modified example 1-8.

FIG. 29 is a diagram showing another example of the distribution display.

As shown in the figure, a distribution display D180 may be formed of a plurality of circles D181 to D184 with a coordinate position of each object being as the center, for example. The size of one circle is not particularly limited and, for example, can be a size overlapping with the circle of another grouped object. For example, the circle may be configured such that the diameter is larger as a distance between the user wearing the display unit 11 and the object is smaller.

Further, in the distribution display D180, a region in which a plurality of circles overlap with one another may have a color tone with a lower brightness.

Further, as shown in the figure, a plurality of circles may be integrated to form one distribution display. This can emphasize the group.

Also with such a distribution display, the distribution state of the objects can be expressed by the shape and arrangement.

Alternatively, in a case where there are many objects to be grouped, the distribution display may be configured as aggregate of points corresponding to one object. Also with this configuration, a region having a high density of the objects in the distribution display can be expressed by a dense color tone because the points are drawn so as to overlap with one another, so that the color tone can be changed on the basis of the density of the grouped objects.

Modified Example 1-9

The controller 20 may not have a configuration capable of switching between the first and second modes but have a configuration having only the first mode described above.

Second Embodiment

Figure 30:
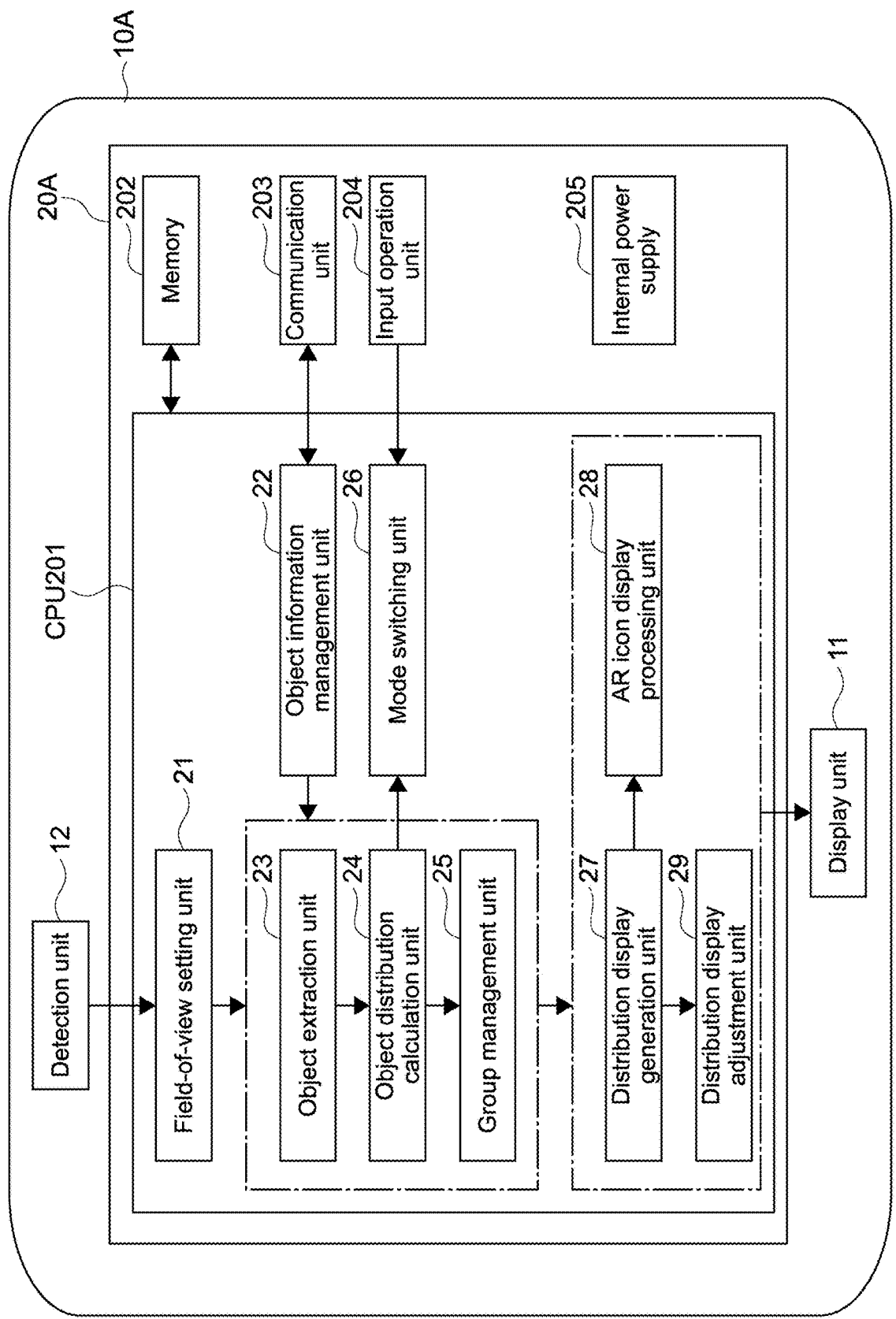
FIG. 30 is a block diagram of an HMD for describing a functional configuration of a controller according to a second embodiment of the present technology.

FIG. 30 is a block diagram of an HMD for describing a functional configuration of a controller according to a second embodiment of the present technology.

An HMD 10A according to this embodiment includes a display unit 11 and a controller 20A, and the functional configuration of the controller 20A is different from that of the first embodiment. Note that the hardware configuration of the controller 20 is similar to that of the controller 20 shown in FIG. 3, and thus description thereof will be omitted.

Note that in the following modified example a configuration similar to that of the embodiment described above will be denoted by identical reference symbols, and description thereof will be omitted.

As shown in FIG. 30, the controller 20A includes a field-of-view setting unit 21, an object information management unit 22, an object extraction unit 23, an object distribution calculation unit 24, a group management unit 25, a mode switching unit 26, a distribution display generation unit 27, an AR icon display processing unit 28, and a distribution display adjustment unit 29.

When determining that a proportion of an area of a distribution display in a field of view is larger than a first proportion (predetermined proportion), the distribution display adjustment unit 29 can reduce the distribution display to the first proportion or less.

Additionally, when determining that the proportion of the area of the distribution display in the field of view is smaller than a second proportion, the distribution display adjustment unit 29 can increase the distribution display to the second proportion or more. It is assumed that the second proportion is smaller than the first proportion.

Figure 31:
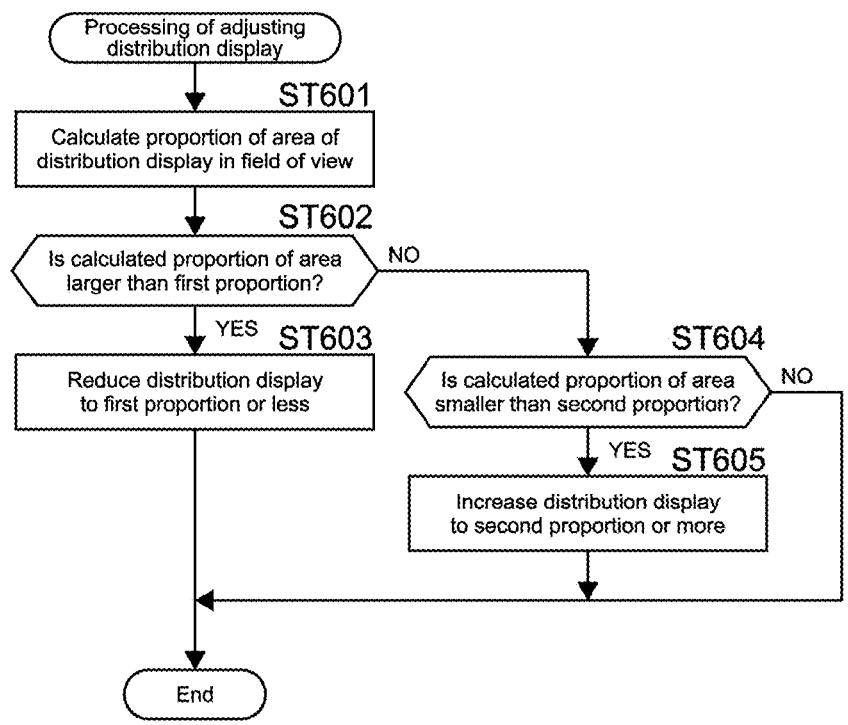
FIG. 31 is a flowchart showing an example of operation of the controller.

FIG. 31 is a flowchart showing an example of operation of the distribution display adjustment unit 29.

The distribution display adjustment unit 29 calculates a proportion of an area of the distribution display in the field of view after a distribution display is generated (ST601).

Subsequently, the distribution display adjustment unit 29 determines whether the calculated proportion of the area is larger than a first proportion or not (ST602).

When it is determined that the calculated proportion of the area is larger than the first proportion (Yes in ST602), the distribution display adjustment unit 29 executes processing of reducing the distribution display to the first proportion or less (ST603).

Meanwhile, when it is determined that the calculated proportion of the area is the first proportion or less (No in ST602), the distribution display adjustment unit 29 determines whether the calculated proportion of the area is smaller than a second proportion or not (ST604).

When it is determined that the calculated proportion of the area is smaller than the second proportion (Yes in ST604), the distribution display adjustment unit 29 executes processing of increasing the distribution display to the second proportion or more (ST605).

Further, when it is determined that the calculated proportion of the area is the second proportion or more (No in ST604), the distribution display adjustment unit 29 terminates the processing without executing the reduction or increase of the distribution display.

The distribution display adjustment unit 29 can reduce the distribution display by using dispersion (i.e., $\sigma^2$) of a value smaller than, e.g., an actually calculated value, for the distribution display generated using the Gaussian function. Similarly, the distribution display adjustment unit 29 can increase the distribution display by using dispersion of a value larger than an actually calculated value.

The distribution display adjustment unit 29 can execute processing of adjusting the distribution display consecutively after the processing of drawing the distribution display and the AR icon is executed at a drawing timing of every 1/30 sec, which has been described using FIG. 8B, for example. Alternatively, the distribution display adjustment unit 29 can execute the processing of adjusting the distribution display at a predetermined timing that is different from the drawing timing described above.

A reference for adjustment of the distribution display by the distribution display adjustment unit 29 will be described.

The first proportion and the second proportion can be appropriately set by an angle of view of the field of view V of the display unit 11.

Figure 32:
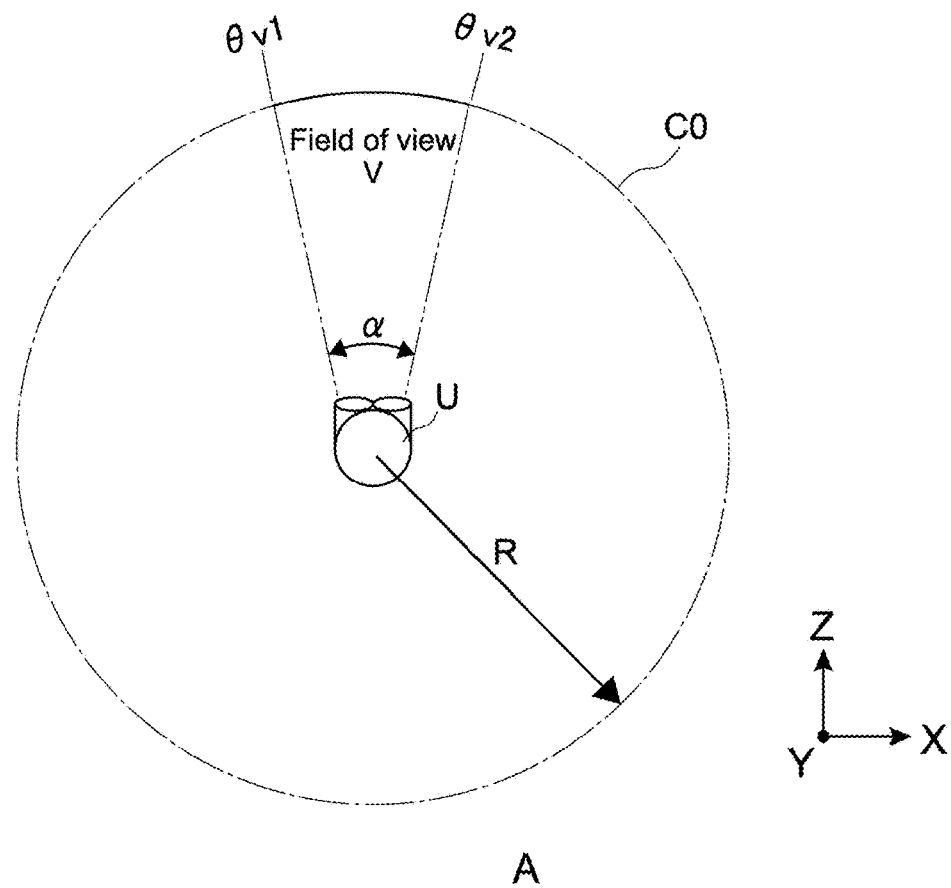
FIG. 32 is a diagram for describing an angle of view of the field of view.
Figure 32:
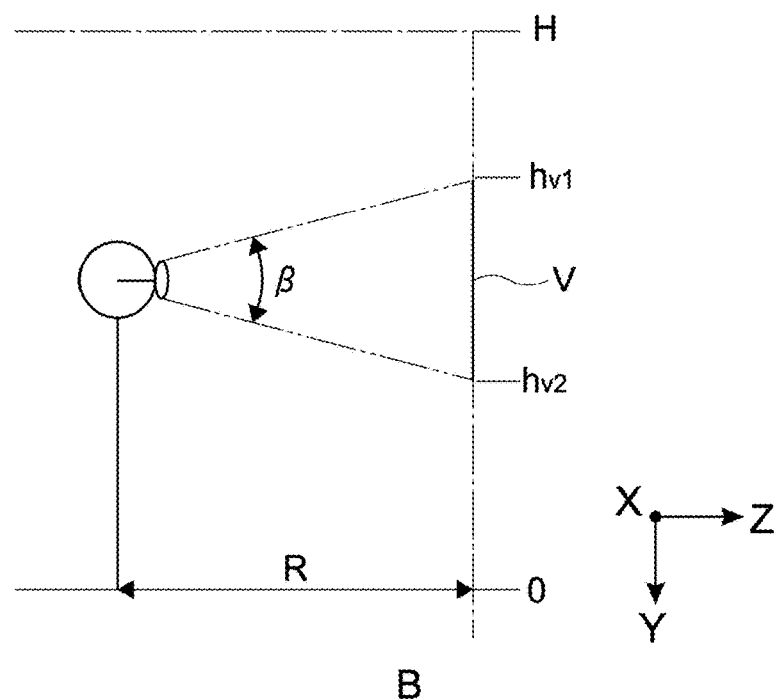

A and B of FIG. 32 is a diagram for describing the angle of view of the field of view V. A of FIG. 32 shows an angle of view a in a circumferential direction (θ direction), and B of FIG. 32 shows an angle of view β in a height direction (h direction).

As shown in A of FIG. 32, the angle of view α can be defined as a range of the field of view V in the circumferential direction (θ direction) in the cylindrical coordinates C0 and defined as follows using Expression (1):

$$a = \theta v2 - \theta v1.$$

Meanwhile, as shown in B of FIG. 32, the angle of view β represents a range of an angle viewed by a user U from the lower end hv2 to the upper end hv1 of the field of view V on the cylindrical coordinates C0 and can be defined by Expression (7).

$$\beta = 2 \times \tan^{-1}((hv2-hv1)/2R) \tag{7}$$

Here, in a case where the angle of view α is 20°, and the angle of view β is 10°, for example, the first proportion can be set to 50%, and the second proportion can be set to 10%.

Further, for example, the field of view V in which the angle of view α is 40° and the angle of view β is 20° is configured to be relatively larger than the field of view V in which the angle of view α is 20° and the angle of view β is 10° with respect to the field of view of the user. In this case, for example, the first proportion can be set to 30%, and the second proportion can be set to 5%. This can present a distribution display with high visibility irrespective of the size of the field of view V.

Further, a proportion of a reduced or increased distribution display can also be appropriately adjusted. For example, the distribution display adjustment unit 29 may reduce the proportion to the first proportion or increase the proportion to the second proportion.

A relationship between the angle of view of the field of view V and the values of the first and second proportions may be, for example, stored in the memory 202 of the AR server 40 or determined by an application program for executing the processing of generating a distribution display.

Alternatively, the first and second proportions may be determined for each HMD 10.

As described above, according to this embodiment, the visibility of the distribution display can be further improved.

Hereinabove, the embodiments of the present technology have been described. However, the present technology is not limited to the embodiments described above and can be variously modified without departing from the gist of the present technology as a matter of course.

Although the above embodiments have described that the AR system includes the AR server, the portable information terminal, the controller, and the HMD, the present technology is not limited thereto.

For example, the AR system may be configured to include no portable information terminal and configured such that the AR server and the controller directly communicate with each other.

Further, the controller may be configured integrally with the HMD or constituted of the portable information terminal. Alternatively, the controller may be constituted of a plurality of devices, e.g., the AR server and the portable information terminal.

Additionally, in the above example of operation, necessary information of an object is acquired from the AR server when the current position of the user changes, but the present technology is not limited thereto.

For example, the controller (HMD) or the portable information terminal may collectively acquire, at the time of activation thereof, information of an object that is necessary for AR display processing and tactile feedback processing, from the AR server and may hold the information in the memory.

For example, the above embodiments have described the example of the HMD having a configuration in which images are presented via the display surfaces 111R and 111L, but the present technology is also applicable to a retina-projection-type HMD, for example.

Further, as an example of the HMD, the example including a transmission-type display has been described. However, the HMD may include a non-transmission-type display, for example. In this case, the objects may be not objects distributed in the reality space but objects distributed in a virtual space that may be displayed on a non-transmission-type display. For example, the virtual space may be a virtual space that is established around the user by a game application provided by the AR server or the like.

Additionally, although the example in which the present technology is applied to the HMD has been described, the present technology is also applicable to a contact-lens-type wearable display or a wearable display that is wearable on the wrist, arm, or neck, for example.

Further, the above embodiments have described the example in which the distribution display is generated near the region in which objects are distributed, but the present technology is not limited thereto. For example, in a case where an object is disposed on the upper side outside the field of view, the controller of the HMD may display the distribution display on the upper side of the field of view.

Alternatively, the shape of the distribution display may be a predetermined shape such as an ellipse or circle whose center is at the distribution center of objects, irrespective of the shape of the region in which objects are distributed.

Further, the above embodiments have described the example of changing a color tone on the basis of the density of a plurality of grouped objects, in which a distribution display having a color tone with a higher brightness is generated for a region having a higher density of a plurality of grouped objects. However, the present technology is not limited thereto. For example, the controller of the HMD may generate a distribution display having a color tone with a lower brightness for the region having a higher density of a plurality of grouped objects.

Additionally, the controller of the HMD may generate a distribution display in which an inner color tone distribution or brightness distribution is changed on the basis of, for example, the density distribution of a plurality of grouped objects. For example, the controller can generate a distribution display in which a region congested with stores is expressed in white and other regions are expressed in gray.

Alternatively, the controller of the HMD can also generate a distribution display whose shape is changed on the basis of a density distribution of a plurality of grouped objects. This enables the controller to delete, for example, from the generated distribution display, a part of the distribution display in a region in which there are a few objects or no objects.

Note that the present technology can also have the following configurations.

(1) A display apparatus, including:
a control unit that groups a plurality of objects distributed in a reality space or a virtual space around a user and generates a distribution display, the distribution display displaying a region in which the grouped objects are distributed; and
a display unit that presents the distribution display in a field of view of the user.

(2) The display apparatus according to (1), in which
the control unit generates the distribution display near the region in which the grouped objects are distributed.

(3) The display apparatus according to (1) or (2), in which
the control unit generates the distribution display having a shape associated with a shape of the region in which the grouped objects are distributed.
(4) The display apparatus according to (3), in which
the control unit generates the distribution display having a shape expressing a biased distribution of the plurality of objects.
(5) The display apparatus according to any one of (1) to (4), in which
the control unit generates the distribution display having a transmittance at which the plurality of objects are viewable.
(6) The display apparatus according to any one of (1) to (5), in which
the control unit generates the distribution display such that at least any one of hue, brightness, and saturation is changed on the basis of a density of the grouped objects.
(7) The display apparatus according to (6), in which the control unit generates the distribution display in which a region having a higher density of the grouped objects has a color tone with a higher brightness or a color tone with a lower brightness.
(8) The display apparatus according to any one of (1) to (7), in which
the control unit generates the distribution display by using a probability density function, the probability density function using, as a variable, coordinates indicating a position of each of the grouped objects in the field of view.
(9) The display apparatus according to (8), in which
the control unit derives the probability density function and generates the distribution display that is superimposed on a region in the field of view, in which a distribution probability of the objects has a predetermined value when the derived probability density function is integrated by the variable.
(10) The display apparatus according to (8) or (9), in which
the probability density function is a Gaussian function.
(11) The display apparatus according to any one of (1) to (10), in which
the control unit groups a plurality of objects having associated additional information out of a plurality of objects distributed in the field of view.
(12) The display apparatus according to any one of (1) to (10), in which
the control unit groups a plurality of objects forming a density of a predetermined reference or more out of a plurality of objects distributed in the field of view.
(13) The display apparatus according to any one of (1) to (12), in which
the control unit is configured to be capable of switching between a first mode of executing drawing processing on a group including the plurality of objects and a second mode of executing drawing processing on each of the grouped objects.
(14) The display apparatus according to (13), in which
the control unit selects the first mode when it is determined that a density of the grouped objects in the field of view is a predetermined reference or more.
(15) The display apparatus according to (13), in which
the control unit switches from the first mode to the second mode when it is determined that the user is observing the distribution display.
(16) The display apparatus according to (15), in which
the control unit determines that the user is observing the distribution display when it is determined that the distribution display is superimposed at the center of the field of view.
(17) The display apparatus according to any one of (1) to (16), in which
when determining that a proportion of an area of the distribution display in the field of view is larger than a predetermined proportion, the control unit reduces the distribution display to the predetermined proportion or less.
(18) The display apparatus according to any one of (1) to (17), in which
the display unit is configured to be wearable by the user.
(19) An information processing system, including:
a control apparatus that is capable of storing information on a plurality of objects distributed in a reality space or a virtual space around a user and outputting the information on the plurality of objects; and
a display apparatus including
a control unit that groups the plurality of objects and generates a distribution display, the distribution display displaying a region in which the grouped objects are distributed, and
a display unit that presents the distribution display in a field of view of the user.
(20) A control method, including:
grouping a plurality of objects distributed in a reality space or a virtual space around a user;
generating a distribution display, the distribution display displaying a region in which the grouped objects are distributed; and
presenting the distribution display in a field of view of the user.

REFERENCE SIGNS LIST 10, 10A HMD (display apparatus)
11 display unit
20, 20A controller
40 AR server (control apparatus)
100 AR system (information processing system)

The invention claimed is:

1. A display apparatus, comprising:
a controller configured to group a plurality of objects distributed in a reality space or a virtual space around a user and to generate a distribution display, the distribution display displaying a region in which the grouped objects are distributed; and
a display device configured to present the distribution display in a field of view of the user, wherein
the distribution display is superimposed on a display of the grouped objects in a see-through manner such that the grouped objects are visible to the user through the distribution display, the distribution display having a size and shape that indicates the region in the field of view of the user in which the grouped objects are distributed, and
the controller generates the distribution display by using a probability density function, the probability density function using, as a variable, coordinates indicating a position of each of the grouped objects in the field of view.

2. The display apparatus according to claim 1, wherein
the controller is configured to generate the distribution display having a shape expressing a biased distribution of the plurality of objects.

3. The display apparatus according to claim 1, wherein the controller is configured to generate the distribution display having a transmittance at which the plurality of objects are viewable.

4. The display apparatus according to claim 1, wherein the controller is configured to derive the probability density function and to generate the distribution display that is superimposed on a region in the field of view, in which a distribution probability of the objects has a predetermined value when the derived probability density function is integrated by the variable.

5. The display apparatus according to claim 1, wherein the controller is configured to group a plurality of objects having associated additional information out of a plurality of objects distributed in the field of view.

6. The display apparatus according to claim 1, wherein the controller is configured to group a plurality of objects forming a density of a predetermined reference or more out of a plurality of objects distributed in the field of view.

7. The display apparatus according to claim 1, wherein the controller is configured to switch between a first mode of executing drawing processing on a group including the plurality of objects and a second mode of executing drawing processing on each of the grouped objects.

8. The display apparatus according to claim 7, wherein the controller is configured to select the first mode when it is determined that a density of the grouped objects in the field of view is a predetermined reference or more.

9. The display apparatus according to claim 7, wherein the controller is configured to switch from the first mode to the second mode when it is determined that the user is observing the distribution display.

10. The display apparatus according to claim 9, wherein the controller is configured to determine that the user is observing the distribution display when it is determined that the distribution display is displayed at the center of the field of view.

11. The display apparatus according to claim 1, wherein when determining that a proportion of an area of the distribution display in the field of view is larger than a predetermined proportion, the controller is configured to reduce the distribution display to the predetermined proportion or less.

12. The display apparatus according to claim 1, wherein the display device is configured to be wearable by the user.

13. The display apparatus according to claim 1, wherein the probability density function is a Gaussian function.

14. A display apparatus, comprising:
a controller configured to group a plurality of objects distributed in a reality space or a virtual space around a user and to generate a distribution display, the distribution display displaying a region in which the grouped objects are distributed; and
a display device configured to present the distribution display in a field of view of the user, wherein
the distribution display is superimposed on a display of the grouped objects in a see-through manner such that the grouped objects are visible to the user through the distribution display, the distribution display having a size and shape that indicates the region in the field of view of the user in which the grouped objects are distributed, and
the controller is configured to generate the distribution display such that at least any one of hue, brightness, and saturation is changed on the basis of a density of the grouped objects.

15. The display apparatus according to claim 14, wherein the controller is configured to generate the distribution display in which a region having a higher density of the grouped objects has a color tone with a higher brightness or a color tone with a lower brightness.

16. An information processing system, comprising:
a control apparatus configured to store information on a plurality of objects distributed in a reality space or a virtual space around a user and to output the information on the plurality of objects; and
a display apparatus including
a controller configured to group the plurality of objects and to generate a distribution display, the distribution display displaying a region in which the grouped objects are distributed, and
a display device configured to present the distribution display in a field of view of the user, wherein
the distribution display is superimposed on a display of the grouped objects in a see-through manner such that the grouped objects are visible to the user through the distribution display, the distribution display having a size and shape that indicates the region in the field of view of the user in which the grouped objects are distributed, and
the controller generates the distribution display by using a probability density function, the probability density function using, as a variable, coordinates indicating a position of each of the grouped objects in the field of view.

17. A control method, comprising:
grouping a plurality of objects distributed in a reality space or a virtual space around a user;
generating a distribution display, the distribution display displaying a region in which the grouped objects are distributed; and
presenting the distribution display in a field of view of the user, wherein
the distribution display is superimposed on a display of the grouped objects in a see-through manner such that the grouped objects are visible to the user through the distribution display, the distribution display having a size and shape that indicates the region in the field of view of the user in which the grouped objects are distributed, and
the distribution display is generated by using a probability density function, the probability density function using, as a variable, coordinates indicating a position of each of the grouped objects in the field of view.

* * * * *